United States Patent
Sasson

(10) Patent No.: US 11,238,467 B2
(45) Date of Patent: Feb. 1, 2022

(54) USER ACTIVE LEAD MANAGEMENT SYSTEM AND USES THEREOF

(71) Applicant: Ronen Sasson, Houston, TX (US)

(72) Inventor: Ronen Sasson, Houston, TX (US)

( * ) Notice: Subject to any disclaimer, the term of this patent is extended or adjusted under 35 U.S.C. 154(b) by 951 days.

(21) Appl. No.: 15/525,673

(22) PCT Filed: Nov. 10, 2015

(86) PCT No.: PCT/US2015/059957
§ 371 (c)(1),
(2) Date: May 10, 2017

(87) PCT Pub. No.: WO2016/077348
PCT Pub. Date: May 19, 2016

(65) Prior Publication Data
US 2017/0337569 A1    Nov. 23, 2017

Related U.S. Application Data

(60) Provisional application No. 62/077,385, filed on Nov. 10, 2014.

(51) Int. Cl.
*G06Q 30/00* (2012.01)
*G06Q 30/02* (2012.01)
(Continued)

(52) U.S. Cl.
CPC ... *G06Q 30/0201* (2013.01); *G06Q 10/06398* (2013.01); *G06Q 10/1095* (2013.01);
(Continued)

(58) Field of Classification Search
CPC ......... G06Q 30/0201; G06Q 10/06398; G06Q 10/1095; G06Q 30/06; G06Q 50/16; G06Q 10/107; G06Q 30/0645; G06Q 50/01
See application file for complete search history.

(56) References Cited

U.S. PATENT DOCUMENTS

2001/0027481 A1 * 10/2001 Whyel ................ G06Q 10/109
                                                                    709/218
2002/0077998 A1 *  6/2002 Andrews ................ G06Q 30/02
(Continued)

FOREIGN PATENT DOCUMENTS

WO    WO-2008151326 A2 * 12/2008 ........... G06K 9/6254

OTHER PUBLICATIONS

Locke., Two Essays On Housing: Using Hedonic And Quasi-Experimental Methods In (Dis)Amenity Valuation With Housing Data: The Case Of Communication Antennas, And The Value Of Brand Name Franchises Compared To Local Real Estate Brokerage Firms, Theses and Dissertations—Economics. 2013. (Year: 2013).*

*Primary Examiner* — Patricia H Munson
*Assistant Examiner* — Uche Byrd
(74) *Attorney, Agent, or Firm* — Craft Chu PLLC; Andrew W. Chu

(57) ABSTRACT

Provided herein are systems for managing properties, e.g., real estate or financial properties, in real time and over time. The system generally comprises an electronic device with at least a processor, a memory and a display coupled to the processor and at least one network connection and an interactive management tool coupled to the electronic device. The interactive management tool comprises features for managing captured leads such as Email Alerts, Exporting, Labels, Syncing, Value, and Mobility. Also provided is a method for utilizing the system to capture leads and to interactively manage the same. Further provided herein is a non-transitory machine-readable storage device comprising processor-executable instructions to perform the method.

16 Claims, 21 Drawing Sheets

(51) Int. Cl.
*G06Q 30/06* (2012.01)
*G06Q 10/06* (2012.01)
*G06Q 10/10* (2012.01)
*G06Q 50/16* (2012.01)
*G06Q 50/00* (2012.01)

(52) U.S. Cl.
CPC ............ *G06Q 30/06* (2013.01); *G06Q 50/16* (2013.01); *G06Q 10/107* (2013.01); *G06Q 30/0645* (2013.01); *G06Q 50/01* (2013.01)

(56) References Cited

U.S. PATENT DOCUMENTS

| | | | |
|---|---|---|---|
| 2007/0208604 A1* | 9/2007 | Purohit | G06Q 10/1095 705/7.19 |
| 2014/0195629 A1* | 7/2014 | Abhyanker | G06Q 10/087 709/206 |
| 2014/0278515 A1* | 9/2014 | Kharraz Tavakol | G06Q 10/10 705/2 |
| 2016/0048934 A1* | 2/2016 | Gross | G06Q 30/0276 705/313 |

\* cited by examiner

USER ACTIVE LEAD MANAGEMENT SYSTEM AND USES THEREOF

CROSS-REFERENCE TO RELATED APPLICATIONS

This application is a national stage application under 35 U.S.C. § 371 of international application PCT/US2015/059957, filed Nov. 10, 2015, and claims benefit under 35 U.S.C. § 119(e) of provisional application U.S. Ser. No. 62/077,385 filed Nov. 10, 2014, the entirety of which is hereby incorporated by reference.

BACKGROUND OF THE INVENTION

Field of the Invention

The present invention relates to the field of web-based management systems. More specifically, the present invention relates to a management system comprising a user-implemented interactive tool for handling lead requests automatically until agent intervention.

Description of the Related Art

All sales fields essentially work on the sales funnel concept. Quickly described, the sales funnel visually describes the sales process from initial contact to final sale. It uses the metaphor of a leaky funnel, into which a seller can "drop" sales opportunities. At some point, sales opportunities are removed from the funnel because potential customers become uninterested or there is a lack of fit.

The stages of a sales process refer to a potential customer's degree of readiness to commit to a deal (from the seller's perspective). Or put in a different way, readiness may be seen as the probability of the sale taking place.

As a sales opportunity moves down the funnel, time to closing decreases and the probability of the sale occurring increases. The sales funnel metaphor enables companies or vendors to analyze and manage a portfolio of sales opportunities.

For instance, the real estate industry comprises independent brokers and agents working against buyers and sellers in complex relationships. Sometimes, buyers are also sellers, sellers are also buyers and brokers with agents represent one or both. A typical listing in the real estate industry may generate interest through hundreds of calls or emails, all of which must be answered. However not all of them are qualified buyers. The hurdle is that currently there is no way to automatically process a lead right from the first phone call or email request received. By "processing", what is meant is that from initial lead call or email or form (or any call to action in the marketing material) the lead receives the information requested and essentially qualifies himself to either move forward or drop from the sales funnel stage. While this is most certainly true for small and medium businesses, large businesses often encounter the same challenges from working with multiple agents and teams in which there is also potential for duplication of effort and fragmented communication among team members. Additional industry examples where this is also the case: Multi-family rental markets where units must be rented and many inquires for a unit must be handled. The service industry—electricians, plumbers, carpet cleaning—that typically must answer inquires on the job.

There is a recognized need for a system and method that will enable initial stages of the sales funnel to be done automatically. Therefore, the prior art is deficient in a user interactive system that encompasses targeted communication, matching, property tracking, alerts including related documents such as files and emails. The present invention fulfills this longstanding need and desire in the art.

SUMMARY OF THE INVENTION

The present invention is directed to a system for interactive management of a sales process, such as sales for real estate, multi-family rentals or service industries. The system comprises one or more computers having at least a processor, a memory and a display coupled to the processor and at least one network connection; a server electronically connected to the computer; and a computer-implemented interactive tool coupled to the computers. The computer implemented interactive tool comprises a plurality of modules configured to process and track information for a sale; a plurality of databases related to sales information accessible via the modules; and a user interface integrated in the one or more computers configured to assess the modules and databases.

The present invention is directed to a method for managing leads that utilizes the interactive management system described herein. The method generally comprises capturing one or more property leads via the interactive system. The capture can come from phone calls, web forms, third party advertisement sites. Then automatic programs are set for each source which will be configured to handle the request in the configured way. This includes, but not limited to: Ask for an Email and check for its accuracy. Send a relevant Email to the lead. Allow a document be signed in a secured way. All this is synced with a mobile app that will alert the agent on the process. All the changes in the leads database are synchronized between the servers and the one or more computers.

The present invention also is directed to an interactive management tool tangibly stored in a non-transitory memory or other non-transitory storage media and configured at least partially for user implementation to perform the management functions comprising the interactive management system.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions and certain embodiments of the invention briefly summarized above are illustrated in the appended drawings. These drawings form a part of the specification. It is to be noted, however, that the appended drawings illustrate preferred embodiments of the invention and therefore are not to be considered limiting in their scope.

FIG. 5B is a screen shot of a Lead Call Work Screen in the Call Routing process.

FIG. 10B is a screenshot of an Agent's lead table demonstrating labeling of selected leads.

DETAILED DESCRIPTION OF THE INVENTION

Figure 1:
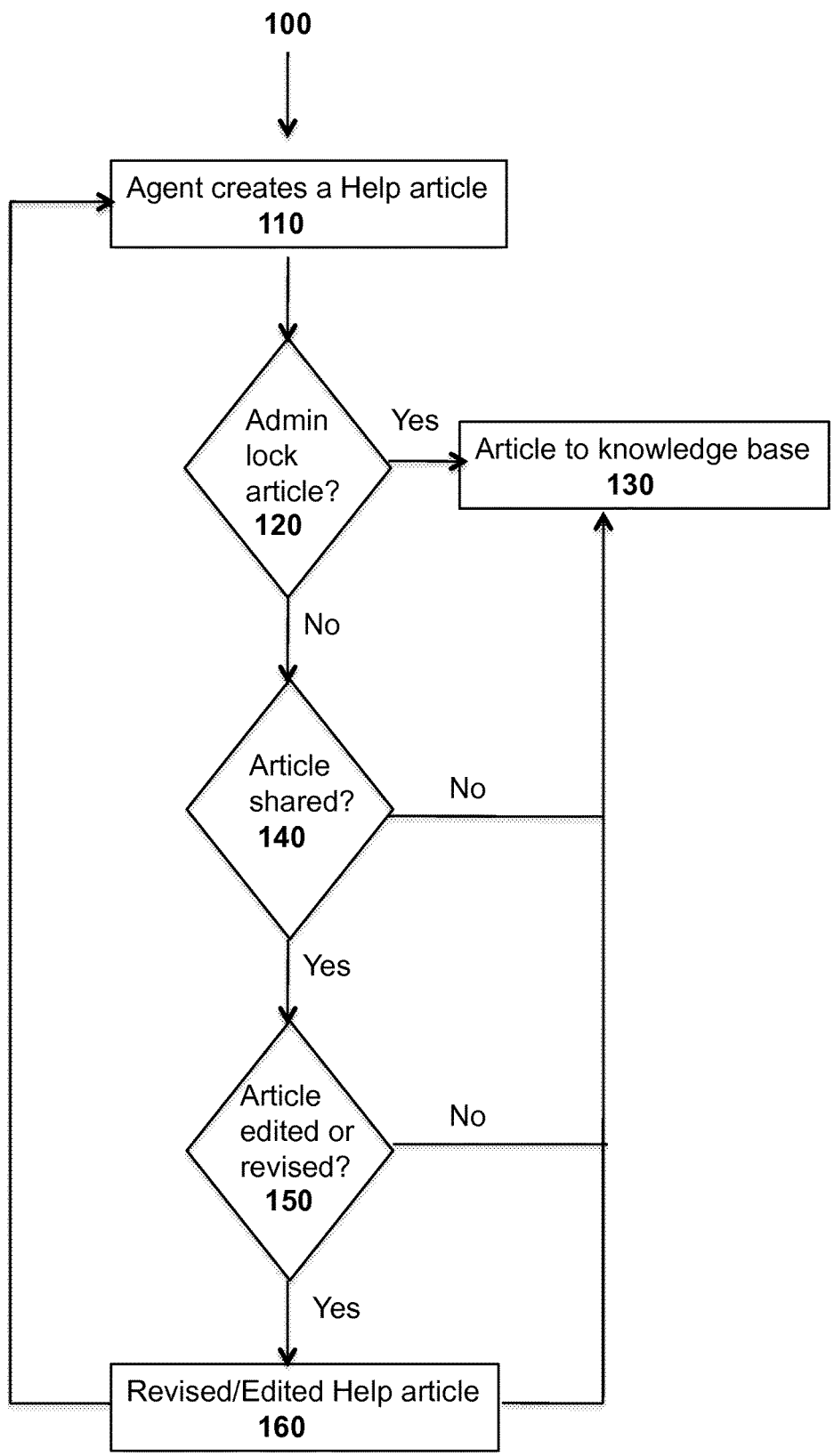
FIG. 1 is a flowchart detailing the process to form a knowledge base.

As used herein, the following terms and phrases shall have the meanings set forth below. Unless defined otherwise, all technical and scientific terms used herein have the same meaning as commonly understood to one of ordinary skill in the art.

As used herein, the term, "a" or "an" may mean one or more. As used herein in the claim(s), when used in conjunction with the word "comprising", the words "a" or "an" may mean one or more than one. As used herein "another" or "other" may mean at least a second or more of the same or different claim element or components thereof. The terms "comprise" and "comprising" are used in the inclusive, open sense, meaning that additional elements may be included.

As used herein, the term "or" in the claims refers to "and/or" unless explicitly indicated to refer to alternatives only or the alternatives are mutually exclusive, although the disclosure supports a definition that refers to only alternatives and "and/or".

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the terms "electronic device", "computer", "computing device", or "computer system" refer to one or more machines that comprise at least a memory, a processor, a display, one or more interfaces and at least one wired and/or wireless network connection. An electronic device may be a computer such as a desktop or laptop machine or computer or other electronic media, for example, a smartphone or tablet, as are standard and currently known in the art. As such an electronic device may comprise a user input device such as a keyboard, keypad, touch screen, mouse, trackball, joystick, camera, microphone, and/or other like user input device. Without being limiting, any software, modules, applications, add-ons, plug-ins, programs and/or databases, etc. and associated instructions and/or functions necessary for implementation of the interactive system or tool may be programmed into the system, may be retrieved over the network connection or may be retrieved from a non-transitory machine-readable media, such as computer readable media or storage device tangibly storing the same, may be tangibly stored in computer memory or other electronic media memory and are executable by the processor.

As used herein, the terms "sales information" refer to any information to be marketed, sold, or communicated to lead in order to advance the sales funnel process. For example in the real estate industry that would mean the property. In multi family setting that would mean a unit to be leased.

As used herein, the term "sales leads" refer to leads or potential prospects that inquire into the system and begin the journey through the sales funnel as described supra.

As used herein, the term "piping" or "email piping is a technique of sending email message as an input to a program rather than appending the message to the mailbox file, allowing for real-time email delivery and handling.

As used herein, the term "sales process" refers to the is a systematic approach involving a series of steps that enables a sales force to close more deals, increase margins and make more sales through referrals. Generally a sales process involves the following key steps: prospecting, qualifying, proposal/presentation, handling objections, closing, and follow-up for repeat business-referrals In one embodiment of the present invention, there is provided a system for interactive management of a sales process. The system comprises one or more computers having at least a processor, a memory and a display coupled to the processor and at least one network connection; a server electronically connected to the computer; and a computer-implemented interactive tool coupled to the one or more computers. The computer-implemented interactive tool comprises a plurality of modules configured to process and track information for a sale; a database related to sales information accessible via the modules; and a user interface integrated in the one or more computers coupled to the modules and databases.

In a preferred embodiment, the one or more computers comprise a personal computer, a server computer, a smart phone, or a tablet computer or any personal device with connection to a database. In this embodiment, the server comprises a Simple Mail Transfer Protocol server, a Domain Name System server, a web server, a Multiple Listing Service (MLS) server, a Secure Socket Layer (SSL) server, a Transport Layer Security (TLS) server which provides a secured channel between two computers operating over the Internet or an internal work, or a combination thereof.

Furthermore, in this embodiment, the interactive tool is configured to send intelligent messages automatically based on program module defined by the agent comprising the sales leads or other information to sales leads at point of contact. Preferably, the interactive tool modules are configured to receive a lead from a call or a webform or third party sources; determine the recipient agent of the lead; receive communication from the lead via preset programs comprising text messages or other chat like options; optionally request form or document signed by lead; verify the accuracy of an email if part of the request; update lead database by adding the communication with the lead; optionally send an automatic message to agents; optionally export sales information from said database; follow-up on leads and verify relevance through automatic programs; and synchronize the sales information between the sever and the one or more computers and mobile applications. The interactive tool modules are further configured for a user agent to search the database for sales leads or other information. Preferably, the system is further configured to extract lead information from third party sources through piping or Application Program Interface (API) and insert said lead information into system. Representative example of the information include, but are not limited to, price, location, type of sales, seller's information comprising name, phone, email. In addition, prior communication history can be retrieved via search from things like Email and text messages.

Further still in this embodiment, the user interface of the interactive tool comprises a help module configured for a user of the system to access and create help tips; a schedule module configured to schedule meetings and book time; a notes module configured for a user to enter notes for each lead; a goal module for a manager to track progress of each agent; a file module for attaching computer files to each lead; a voicemail module configured for a user to listen to messages; an agreement module configured to process signed agreements; a pocket listing module configured to list market properties; a Multiple Listing Service module configured to manage listings from Multiple Listing Service; a report module configured to provide report and overview for each lead; a setup module configured to configure system features comprising security, lines and programs; and a lead connect module configured to enable third party advertisement source connections. Preferably, the goal module may further be configured for an agent to set goals for each lead. The user interface further comprises interface to synchronize sales leads information in the system with third-party software. In a preferred embodiment, the interface and the third party software is configured to send lead request for booking time, synchronize calendar availability from agents; display leads the available times; lead-choose best time; and send confirmations to leads and agents and mark calendars.

Further still in this embodiment, the user interface may further comprise an interface to accept sales leads information in the system from a third-party vendor. Representative examples of the third-party sources include Loopnet, MLS Listings, Craigs lists. This is achieved by taking incoming lead alerts from such third party sources which come as Emails and "piping" them into the system. There are generally two options for this to be achieved: through Email piping or Application Program Interface (API) provided by third party.

In another embodiment of the present invention, there is provided a computer-implemented method for obtaining property matches for a lead. The method may comprise the steps of accessing the user interactive tool described supra; user-inputting criteria of sale requirements; optionally building profile of sales information from lead behavior; receiving a query about a lead or other sale information as input; searching databases about the user-requested a lead or other sale information; retrieving the user-requested a lead or other sale information; transmitting the lead or other sale information to the user. This method may further comprise user-updating the retrieved lead or other sales information via the interface of the interactive tool or mobile application; and transmitting the modified lead or other sales information of the lead to the server and one or more computers.

Further in this embodiment, the step of user-updating the lead database is conducted via the note module, the help module, the file module, the schedule module, the goal module or a combination thereof.

In yet another embodiment of the present invention, there is provided a computer-implemented method for managing sales leads. The method comprises the steps of receiving leads via the user-interactive tool described supra; determining the recipient agent of the lead; receiving feedback information from the lead; verifying the accuracy of the feedback information; updating lead database by adding the feedback information; sending an automatic message to the user; exporting sales information from the database; and synchronizing the sales information between the sever and the one or more computers. Preferably, the method may further comprise the step of synchronizing information of a lead or other sales information in the database with third-party software for scheduling events via the interface thereof.

In yet another embodiment of the present invention, there is provided a computer-implemented method for tracking sales progress for an agent. The method comprises the steps of accessing the user interactive tool described supra; accessing the goal module via the interface of the user interactive tool; user-inputting criteria of goals to be achieved.

In yet another embodiment of the present invention, there is provided a non-transitory machine-readable storage medium comprising processor executable instructions to perform the computer-implement method for obtaining information of a lead as described supra.

In yet another embodiment of the present invention, there is provided a non-transitory machine-readable storage medium comprising processor executable instructions to perform the computer-implemented method for managing sales leads as described supra.

In another embodiment of the present invention, there is provided a non-transitory machine-readable storage medium comprising processor executable instructions to perform the computer-implement method for tracking sale progress for an agent as described supra.

In another embodiment of the present invention, there is provided a computer-implemented method for managing a sales lead call. The method comprises the steps of receiving a lead call via the system as described supra; interacting with the lead call automatically via text messages; receiving emails; sending relevant information via email automatically; determining an interaction method based on a decision tree; and following up lead call by an automated email campaign or any other follow-up means such as calls. Representative examples of the interaction method include, but are not limited to scheduling an appointment, requesting for filling out a form, or having immediate interaction. The computer-implemented method further comprises the steps of downloading listings from Multiple Listing Service in to the system; and enabling an agent to add custom notes and routing to the Multiple Listing Service, which is only accessible to said agent.

In this embodiment, the interaction method of scheduling an appointment comprises the steps of sending an automatically generated appointment-request message comprising a link to a booking website or application to the lead; lead-booking the appointment via the link; sending an appointment confirmation message to the agent of the lead; agent-confirming the appointment via the system; sending final confirmation to the lead; updating information of the lead; and sending a reminder message to the lead prior to said appointment.

In another embodiment of the present invention the system creates a top level website which can be easily customized with a separate interface by the agent. The website can be configured to create listing information from BOTH the MLS module and pocket listing into one single website. System generated property numbers along with MLS numbers are used to route the calls to the agent as described via the figures provided. FIG. 5C describes this embodiment.

In another embodiment of the present invention incoming leads are automatically assigned labels and groups based on programs. Labels can be configured to automatically display alerts on the web console or mobile or both alerting agents to events. For example a "hot" lead can be configured via a group or label after lead answers some interactive questions. Alerts will then appear on the mobile or desktop client immediately.

Further in this embodiment various configurations can be made to how leads are viewed. For example leads can be set to "snooze" until a followup date is determined. On the followup date the lead will appear on top of the list for the agent to act. Another example is a large set of leads can be optimized on the mobile app by configuring how far back to sync leads from the database to the mobile app.

In yet another embodiment of the present invention the system will intract with the third party storage providers to allow for document management. The agent simply creates a folder structure which includes the leads unique ID. Any files put in that folder of the leads ID are simply synced back to the system and attached in an integrated view.

In yet another embodiment of the system after a series of communication the lead maybe provided a link which will automatically log him into the website that has been generated from the system or an external website with the system embedded code. The link will be that of a specific profile page where custom choices and preferences can be set. Based on those specifications the system will then generate matching items to be sent to the lead. For example in the reason estate industry a lead may receive a link to a profile section where he can set preferences of the types of properties which might fit his needs. Based on those selections as soon as properties that match this criteria become available they will be delivered to the Email in the leads record. The lead essentially builds a profile by browsing the site and the system will create the preferences by examining site behavior such as searches and favorite properties.

In yet another embodiment an agent will configure certain responses with specific labels. These labels are then configured to alert the agent in real time via the desktop and/or mobile app for real time response. For example in the service industry a label can be configured to alert an agent for a "yes" answer to the question: "Is your electrical issue an emergency?". This would then trigger an immediate alert in the mobile and desktop to be addressed immediately. Other issues such as being asked to provide an estimate could be handled at a better time by the agent.

In yet another embodiment of the system each lead source such as phone lines or third party ad sources are configured with programs to handle requests. The logic to handle a request is loaded into a programs through the program chain messages. These are all the possible messages or combinations of communications that might be needed to process a lead interaction. Chain messages are then ordered into a flow through a program flow. So for example if a lead has been sent an Email the flow might dedicate that we wait several days before a followup mail is triggered. In each step of the flow a label and/or group can be assigned by the system so that there is an accurate view of where leads are in the sales process.

Further in this embodiment is the decision tree feature of the system. For example in the case of text messages each one is entered into the system and subsequent to that the possible options for an answer. Depending on the answer the system will then either trigger an additional text message, send an Email, label or group a lead. In addition the system allows for intelligent learning of how to respond by providing a "no match" values. Thus in case that a response is received by the lead that the system does not know what to do with a "no match" option can be triggered.

Provided herein are an interactive system, interactive tool and methods that enables those in industries, such as the real estate industry, service industry or financial industry to interact with sellers and buyers and to manage these relationships in real time and over time. The system, interactive tool and methods may be web-based. Generally, leads captured from calls, email, webforms, etc. by the interactive system or tool are routed to agents based on business rules and events trigger automated processes. Furthermore, the interactive system provides a way to track properties over time as sellers' status change and price points can be met to trigger a transaction. All communication across the interactive system is tracked and is data mined for further opportunities.

General Information of the System

The system is comprised of both a desktop and a mobile application which work together to give the agent a complete real time view of incoming leads to move them through the sales pipeline. Each module allows for Optional List, Add/Copy, View, Edit, Delete, Multi-Update and Search. The system is configured as a responsive layout for both desktop and mobile use.

User security is at the core of the system. All modules are secured by permissions based on two types of user level security. There are static user levels which cannot be changed and dynamic user levels which can be altered by a broker or manager. Data is not only secured based on the module, but also based on fields. For example, once a lead is inserted into the system, its phone number cannot be changed. Thus, an agent cannot claim that he never received a call from a potential lead. There is also a manager view which enables the owner to setup a hierarchy within the office.

The interactive management system or tool comprises and enables several levels of relationships among users, such as agents and managers, owners, etc. and communication among the same. As described the system enables, inter alia, scheduling, email, voicemail, messaging, adding messages and notes, records matching, and marketing. Moreover, the interactive management system tracks sales, owner/representatives, units, schedules, files, agreements, the message chain, and developments.

Features

The interactive management system provides a plurality of features for users including modules for Email Alerts, Exporting, Labels, Syncing, Value, Mobility, and Lead Capture. As discussed the interactive management system provided herein is a mobile system. The system can be accessed on any mobile device comprising at least a memory, a processor and a network connection and utilized and stored thereon. Also, as discussed, the interactive management system can capture a lead from any type of phone whether a cellphone, a smart phone or a landline. All features of the system enable a user to receive, store, access, review, update, transmit, export, or import a large amount of lead information over time.

The Email Alerts module generates emails based on business rules that send reminders to agents, managers and owners about various leads or properties to be tracked. Also because the interactive management system has an open database, the Exporting module enables import and export into another user site or software. Export options include, but are not limited to, standard Office products such as Word, Excel, PDF, Email, etc. In addition the Labels module plays an important role in highlighting screen. Using the Labels module, each Agent can add a label based on the table field. A color for the added or any label is assigned so agents can quickly review their leads.

Syncing enables the interactive system to handle hundreds of thousands of leads. The system utilizes just in time concepts to insert the lead to the phone and/or to remove the lead when certain conditions apply. For example, the Syncing feature can insert a lead into the lead follow-up date field or delete the lead if it has not been updated in a user adjustable period of time, for example, 180 days. The interactive system supports syncing with manual overrides. That is the lead table provides a syncgcon field (sync to Google Contacts) for adding, updating or deleting a lead.

The system also has a mobile application which allows a "mobile first" approach and gives field agents the ability to interact with the system through an agent mobile app. The app greatly increases the use of the system through a seamless syncing between the mobile and desktop.

The interactive management system is not limited to properties, but can be configured for industries such as the financial services industry. As such the interactive system comprises a Value feature. The Value module enables various value items to be added to the system. For example, a sales agent in the financial world can profile leads based on the types of investment products which can be offered to the leads.

System and Methods
Dashboard

The dashboard organizes for a user all the activities of the day. The dashboard enables a manager and owner to see the leads of those who report to them. This includes new leads that came in and previous leads to be followed up on. Leads that have labels also are organized to enable a review of that which can be further moved towards a deal. The labels concept plays an important role in highlighting screens and organizing the information based on agent selected colors. Using the Labels module, each Agent can add a label based on the table field. A color for the added (or any) label is assigned so agents can quickly review their leads.

Leads Module

The lead module is considered to be a backbone module since all other modules to connect and interact with that module. Therefore in addition to the lead overview dashboard each lead in particular has an individual view. This allows for a summary of the leads activities over time.

Rule based syncing enables the interactive system to handle hundreds of thousands of leads with an agent's mobile phone without data overload. The system utilizes just in time concepts to insert the lead to the phone and/or to purge the lead based on follow-up dates. For example, the Syncing feature can insert a lead into the lead follow-up date field or delete the lead if it has not been updated in a user adjustable period of time, for example, 180 days. The interactive system supports syncing with manual overrides. That is the lead table provides a syncgcon field (sync to Google Contacts) for adding, updating or deleting a lead.

Lead Calls for a Specific Property Come Via Line Setup

After the lead leaves a message or hangs up the system, it can be configured to send an SMS (short message) asking for an email to send further information regarding the property for which the lead called.

Leads Area

A lead lifecycle is such that over time a lead is a buyer, a seller, a broker, a representative, and/or an owner. A lead may be captured from Professional Partner sites, an office website, a phone call, or social media. Lead processing comprises complex routing rules. A drip campaign enables pre-set Emails to a Lead and follow-up emails to an agent. Each lead is assigned to an Agent in a round robin, up or out campaign format. The Agent follows the lead throughout its lifecycle and no duplication is allowed.

Once a lead is captured then the system begins to automatically work on the lead. The source of the lead capture (Call, Webform, Email) is checked and compared with the action steps set in the programs. In a real estate scenario for example when a lead calls a set line (x) then the system can be configured to inquire if the lead is a broker or a buyer. Depending on that answer the system will then route the responses and follow up plans to match the type of lead. If a broker the system will send the information on how to access the house. If a buyer, however, the system can be configured to capture the email and send a preapprove application.

Statistics are kept on the lead to the various lead activities and harvested to make intelligent communication. In a real estate situation this information is used to build a profile on the lead and send matching properties. Depending on the properties visited, the amount of Emails actually opened, a lead score is given to indicate sale probability.

The leads module also provide for custom settings for each lead. For example each lead can be snoozed until a desired popup time as set in the follow-up date on the dashboard. This feature is particularly useful when there are thousands of leads and not all are relevant at the same time.

Programs Module

All incoming leads are handled by the system through the programs module. The system identifies the incoming source and fires the program based on that source. A program is built by two simple steps:

1. Assign all relevant messages to program;
2. Program the step order of the program.

Programs are closely integrated with the Chat Tree (For example text or sms) module. This module allows an agent to have a "conversation" with the lead and based on responses prospect the lead and even send relevant information. For example a lead calls and is answered either by an agent or voicemail. Then he receives a text message with a question. Depending on the answer he will receive the next relevant text message. This module is extremely flexible and works as a platform to move the lead forward.

Marketing

In the real estate industry property lifecycle is such that the seller starts with a high price and over time may settle for a price different than that at the starting point. The interactive management system tracks this progress over times and helps an agent gain advantages by being at the right place in the right time. Each property is tracked in terms of type and social relationship. All critical information kept about property includes, but is not limited to, price, location, type, etc.

The organizational structure maintains a logical flow and comprises an overview, including all types, development, and units.

The interactive system integrates all types of listings in a business method that allows an agent to engage the seller and buyer at the right times. Examples of listing types are private sales, foreclosures, off market, and auctions and can be integrated with, for example, MLS listings from any Multiple Listing Service (MLS). This allows matching across multiple listings. Moreover, the interactive system enables reverse matching and targeted marketing. The interactive system enables an MLS record creating an agent as lead while checking for duplicates. Users also can create criteria for an MLS fee with an area of interest. Properties can be matched with leads based on specific criteria which are set for each lead. The matching algorithm uses ranking input from the agent against the lead to increase the potential likelihood of a property fit. Minimum and maximum value logic work to define the parameters that would maximize the value that can be delivered under constraints set by the buyer.

Sales

The system provides for a specialized area titles under a module called "sales" which is used to aid in marketing a specific project. Thus project specific information can be sent by multiple agents and one agent can be assigned to handle requests.

Agreements

All Agreements, such as confidential non-disclosure and non-compete agreements, in the interactive management system are digital and are signed and filed with the lead. This is a major advantage in that all forms can be selected, signed and filed with the proper lead for later retrieval. There are two options for signatures since both can be traced to the signer. Signatures may be on site signatures such as on a mobile device, such as a laptop computer or tablet or smart device, such as an iPhone or Android. Alternatively, signatures may be an email signature.

Reports

The system includes a comprehensive reporting module which gives the Agent a real time visual representation with feature rich abilities. This includes detail, summary and cross tab reports. Multiple charts types are supported by the system such as column 2D chart, column 3D chart, pie 3D chart, pie 2D chart, line 2D chart, bar 2D chart.

Scheduling and Booking

Generally, in an overview of the user interactive tool of the management system, a user can access modules for Scheduling, Tasks, Notes, Files, Goals, and Help. Particularly, a user can integrate with known time-management and organization web applications such as, but not limited to, the calendaring application GOOGLE CALENDAR™ and the GOOGLE TASKS™ program, both owned by GOOGLE Inc. via syncing. Overall communication is enabled by the Emails Alerts feature of the interactive system in which, based on business rules, emails are generated to send reminders to agents, managers, owners, etc. about various existing and/or new leads or properties to be tracked.

For example, Scheduling may be integrated with GOOGLE CALENDAR™ and the feature Tasks may be integrated with GOOGLE TASKS™. Notes enables a user to link with various objects such as leads, properties, units, etc. and Files enables a user to link with various objects comprising the system. In Goals, managers can set goals to track progress of agents and agents themselves can set goals. The Help feature enables agents to build their own knowledge base and to share with others concepts they have learned.

The process begins as part of a program where a lead receives a text message or Email with a link to the booking portion of the site. The lead clicks on the links and the booking area opens allowing the agent to request a specific time and date. Upon entering captua information and finalizing booking an SMS confirmation is sent along with Email. The agent in turn receives notification from Skyler to confirm the appointment.

A day before an appointment and in order to reduce no-shows by a significant percentage an SMS and Email reminder goes out the lead to confirm the appointment. A he pushes a link and the appointment is confirmed.

Automessages

The Email Alerts module generates emails based on business rules that send reminders to agents, managers and owners about various leads or properties to be tracked. Overall communication is enabled by the Emails Alerts feature of the interactive system in which, based on business rules, emails are generated to send reminders to agents, managers, owners, etc. about various existing and/or new leads or properties to be tracked.

The system can be highly customized, providing the ability to white-label with custom logos, fonts, and set domain email as opposed to those in a generic system. All alerts to leads come with the company domain and replies can be routed to different emails based on business rules. For example a reminder may be sent by the system, but the reply comes back to the specific agent for whom the alert is relevant.

Phone Lines

Incoming numbers are assigned to the system from phone line providers. In addition the system has the ability to import existing phone lines. Each phone line provides the agent complete flexibility in routing.

An incoming call can be configured to be handled in the following way as determined by a "switch" concept:

a) Message—An audio file can be uploaded and played on incoming call.

b) Message+random—Several types of audio files can be uploaded and played. On call a random one will be chosen and played.

c) Forward—A call will be directly forwarded to one or several phones. The first one who picks will drop the others.

d) Message+forward—first play message and then forward the call.

e) Marketing—have the lead enter the property number and the call be routed based on that rules set in the property area.

f) Message+marketing g) Interactive Voice Response—the system has the ability to interact with the lead based on DTMF dial tones input via the keypad. These responses will then be routed to different areas.

Connect

The system allows processing incoming leads from external system by converting incoming email from the external source directly into the database. First the system assigns a dedicated Email to the source. As incoming lead requests arrive from the source via Email the system quickly processes them on the server side by striping non-relevant tags and unnecessary information and inserting into the database.

Next programs are configured based on the specific source combined and specific information requested.

Email Verification

Once the email is received it is loaded with lead, but not before it is checked for validity. The interactive system has a built-in SMTP Server to verify MX-Records that are extracted from a DNS Server. The interactive system connects to SMTP servers and simulates the sending of a message without actually sending a message. Thus, if an email is incorrect or does not exist the agent will be prompted. Furthermore, the system checks for existing emails in the system and thus prevents duplication.

Website

The system is setup to create a top level site. The site is highly configurable with the ability to build custom modules and scripts. A user is enabled to create or use an infinite array of themes, templates, and options. The site is easy to operate and has all the definitions required for search engine optimization. In addition if required E-commerce can be added.

Social Media

Social media is used to advance properties in a unique way. Each agent can link unlimited social media accounts to his account such as LinkedIn, Twitter, Facebook, Tumblr, Wordpress.org, etc. In addition, an agent can authorize other agents to post to his accounts. Once a marketing post command has been issued in the system for a property, a link including set media text is posted on the media sites. This is a powerful feature that saves time for agents in logging in and posting on the many existing social media sites.

Mobile Application

The system is complimented by a mobile app that is supported both for the iPhone operating system and Android system. The functions of this mobile application include but are not limited to, reminding agents of incoming opportunities.

Accounting Integrations

The system is configured to connect to third party accounting system and extract relevant information to be displayed in lead or website. In the real estate industry for example accounting information such as tenant ledgers, balances, payment history can be connected to the lead. On call or display such relevant information as balances can be immediately displayed. On website unit availability information can be automatically accessed in real time.

As described below, the invention provides a number of advantages and uses, however such advantages and uses are not limited by such description. Embodiments of the present invention are better illustrated with reference to the Figure (s), however, such reference is not meant to limit the present invention in any fashion. The embodiments and variations described in detail herein are to be interpreted by the appended claims and equivalents thereof.

Figure 2:
FIG. 2 depicts the input fields in the Desk feature Meeting Schedule.

FIG. 1 illustrates the formation of the knowledge base of the Help feature in the interactive system. Help-Knowledgebase 100 is structured such that the agents themselves grow the knowledge base through experience. For example, an agent creates a help article 110. Once an administrator locks 120 an article it cannot be modified or changed until released. If the created article is locked, the article can become part of the knowledge base at 130. If the article is not locked, that article can be shared 140 with other agents or office. If the article is not shared, it can become part of the knowledge base at 130. If the article is shared, another agent can either add his notes to the edit or revise article or "copy" the article to his own user to restructure the article and possibly creating a better version of the article at 160. The revised/edited help article can become part of the knowledge base at 130 or re-shared with the agent originally creating the article 110 or another agent or office FIG. 2 illustrates the Meeting Schedule 200 feature. Based on the follow up date 210, an email alert 215 is sent to the agent. Based on the ALERT, which is a required field, the following is triggered. The night before a scheduled meeting, an email and Short Message Service (text) message is sent to the Lead 220 and all parties involved and the date plus any other message in the field shortmsg 230. Any replies received, confirmations or changes, will come to the meeting organized (AGENT).

Figure 3:
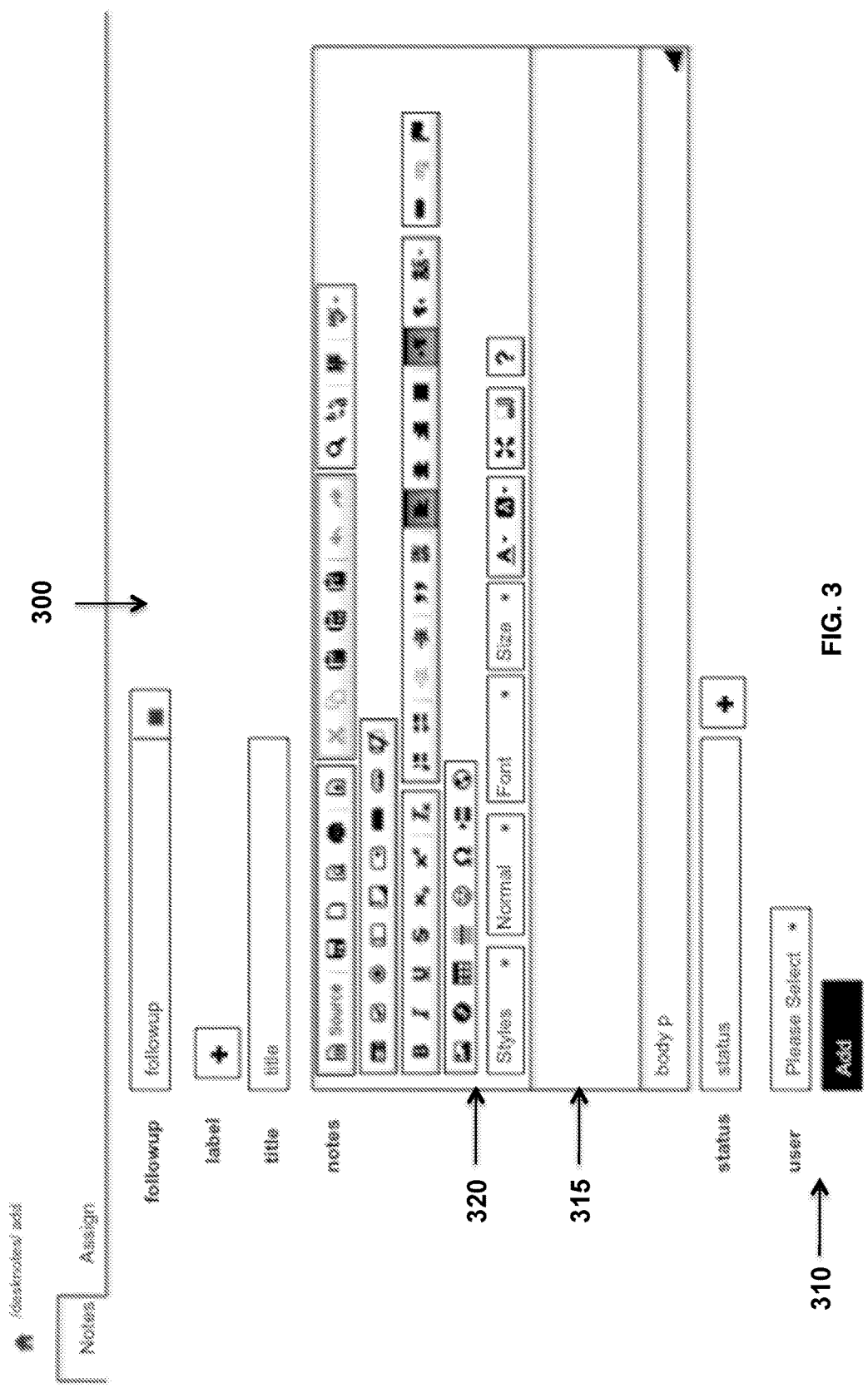
FIG. 3 is a screen shot of the Desk feature Notes.

FIG. 3 illustrates the Notes 300 feature. Specific notes may be created by a selected user 310 at 315 via a known and standard toolbar 320. Notes may be linked to one or more leads and/or properties and/or other units.

Figure 4:
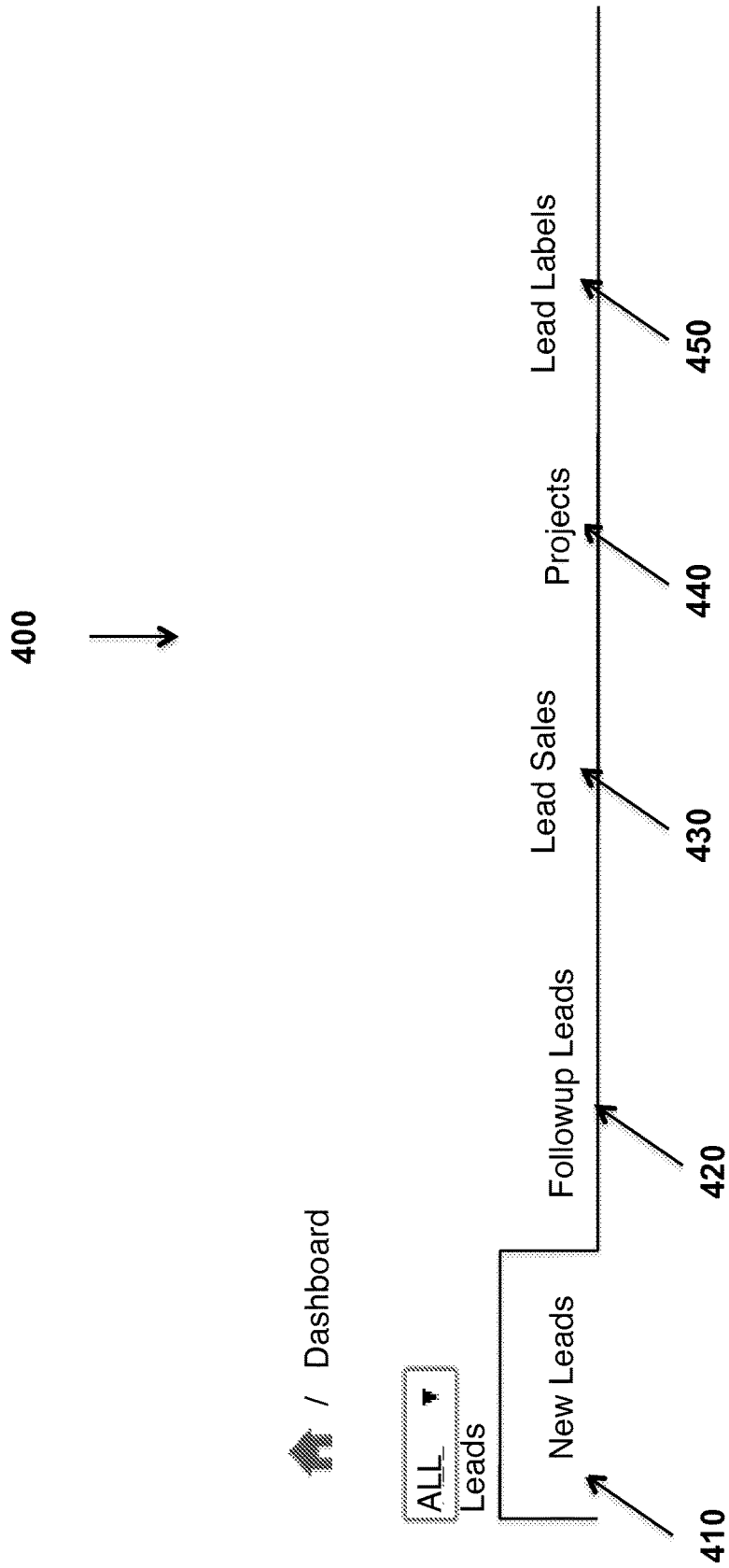
FIG. 4 is a screen shot of the Leads feature Dashboard

FIG. 4 illustrates the Dashboard 400 feature. A user can select New Leads 410 which lists what leads were created for that day. A user can select Followup Leads 420 which identifies what past leads need to be followed up on for that day. A user can select Lead Sales 430 which identifies what leads were sent sales materials and therefore need to be followed up. A user can select Projects 440 which identifies ongoing and potential projects. A user can select Lead Labels 450 which is a summary of what leads have been given a custom label that can be potentially discussed.

Figure 5A:
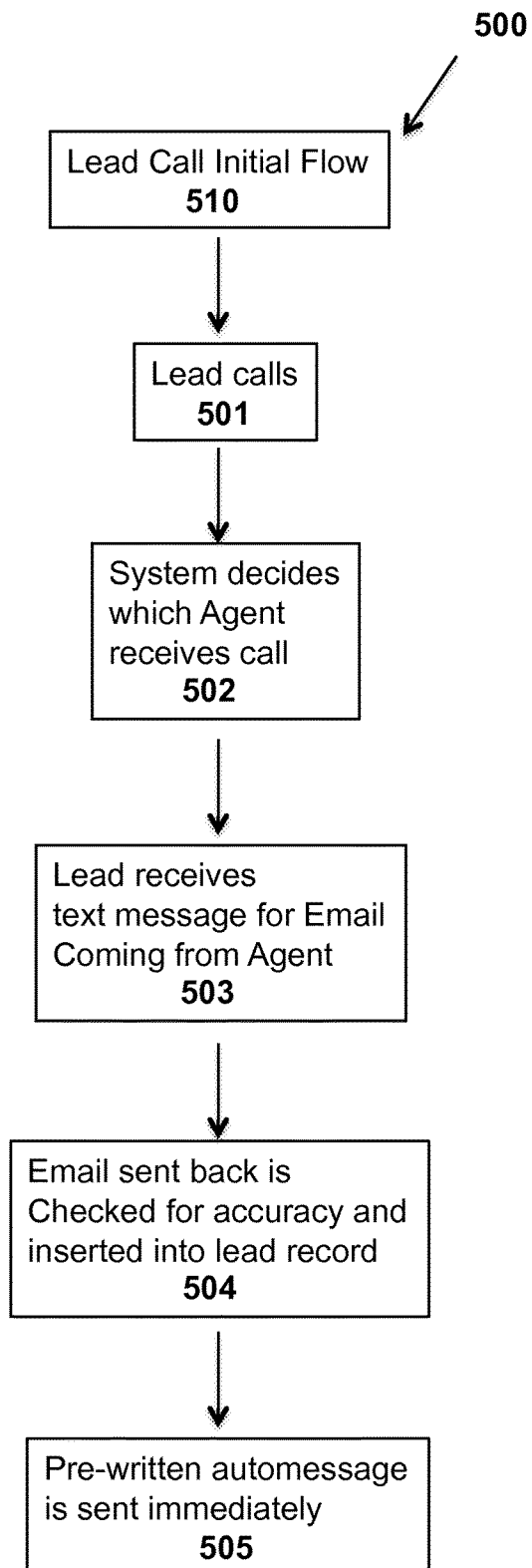
FIG. 5A is a flowchart of the Lead Call Initial Flow in the Call Routing process.
Figure 5B:
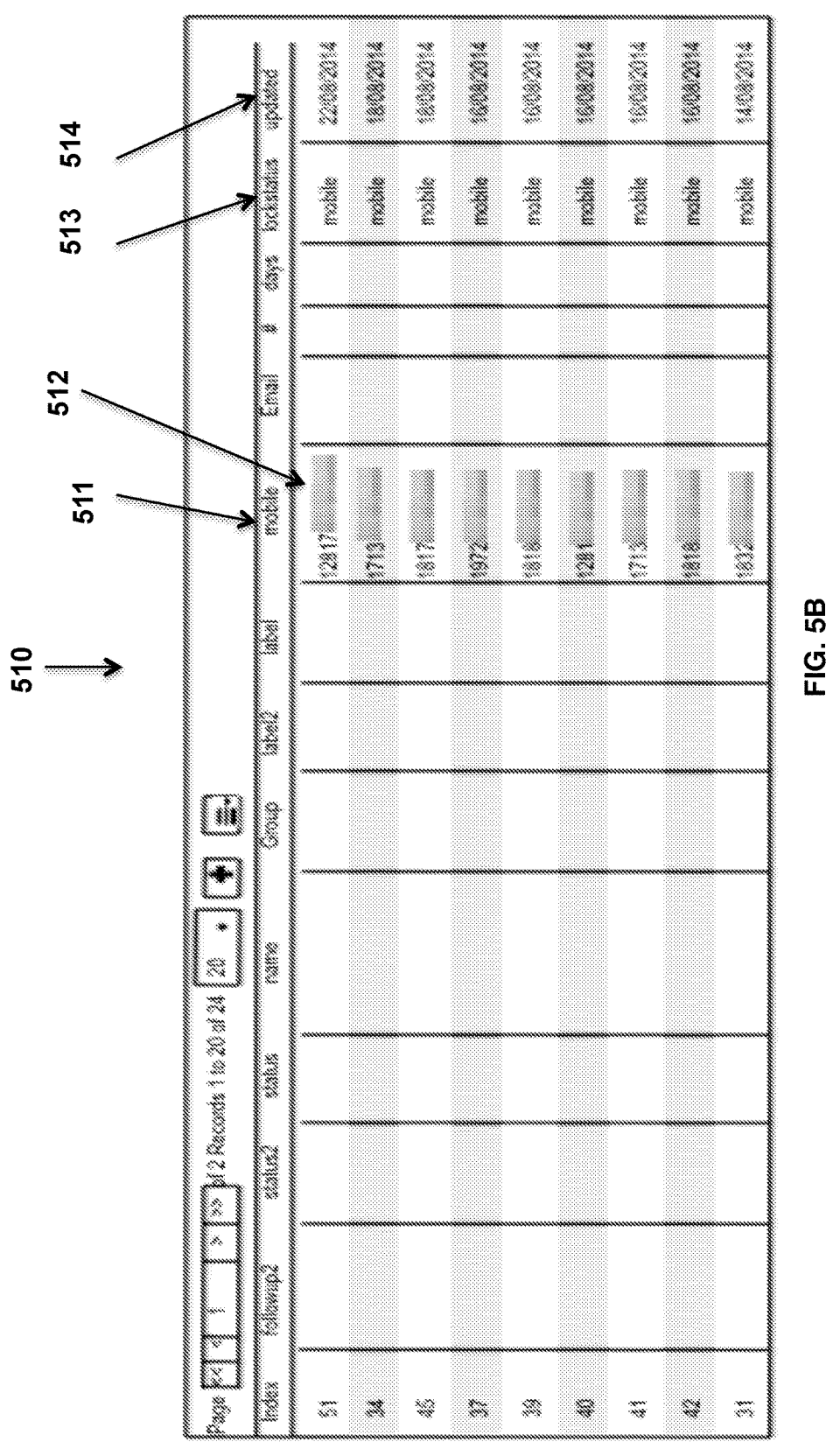
Figure 5C:
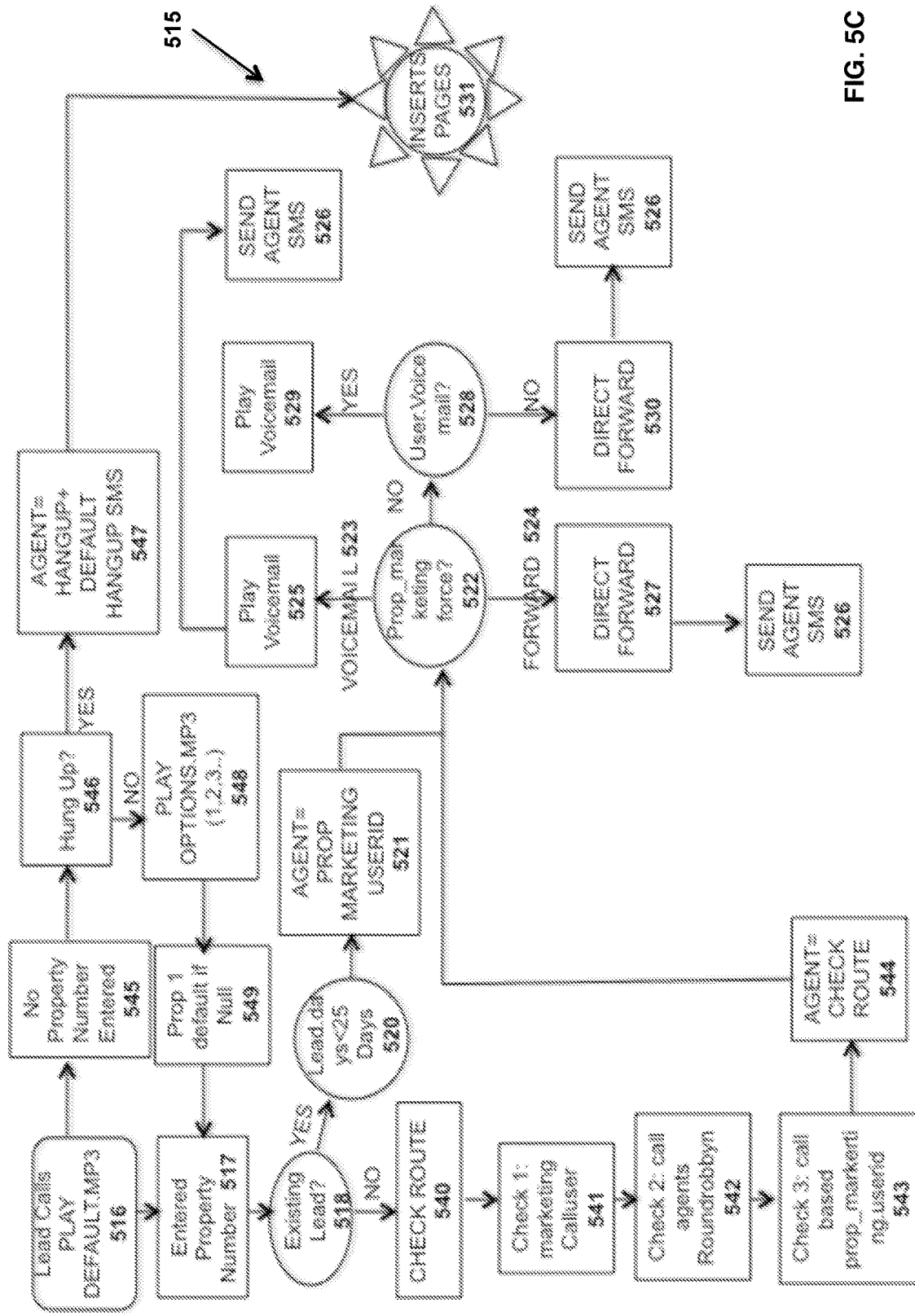
FIG. 5C is a flowchart of the Decision Process for Incoming Leads in the Call Routing process.

FIGS. 5A-5F illustrate the Call Routing 500 process. FIG. 5A shows the Lead Call Initial Flow 510. A lead call is received at 501. The interactive system decides at 502 which agent will receive the call. The Lead receives at 503 a text message for an email coming from the agent. The email sent back at 504 is checked for accuracy and inserted into the lead record. The email from the agent and the email sent back are interactions in an email chain as a first mode. Pre-written automessages in another mode or second mode are sent at 505 immediately.

FIG. 5B is an example of a Lead Call Work Screen 510. The agent receives 511 the call to his or her cell phone and speaks directly to the inquiring lead on the cell phone. The incoming caller ID is recorded 512 for the system to enable any additional processing of the lead. The incoming call is locked as shown in lock status 513. Agents must process a lead or it will be seen as untouched. The agent cannot erase an incoming lead. Each call gets a created date and followup plus 7 days 514 so that reports can be created in many different ways.

FIG. 5C shows the Decision Process for Incoming Calls 515. A Lead call plays 516; MP3 is the default. The property number is entered 517 and checked 518 as an existing lead. If the lead is an existing lead, it is checked to see if received less than 25 days ago at 520 and an Agent is assigned 521. Is the Lead call from a property marketing force 522?. If yes, the call is identified as a voicemail 523 or a forwarded call 524. A voicemail is played 525 and the assigned agent sends 526 a text message to the lead or the call is a directly forwarded 527 to the assigned Agent and the agent sends 526 the text message.

If the Lead call is not from a property marketing force, the system checks for a user voicemail 528. If there is a voicemail, it is played at 529 to the assigned Agent and the agent sends 526 the text message. If no voicemail, the call is directly forwarded 530 to the assigned Agent and the agent sends 526 the text message. The system inserts pages into the record at 531.

If the lead is not an existing lead, Check Route 540 is enabled. The first check 541 is for a marketing call user, the second check 542 is for call agents round robin and the third check 543 is for a call based property marketing user id. An Agent is assigned 544 and the system routes back to property marketing force 522.

If after a lead call is received and no property number is entered 545, the system checks for a hang-up 546. If the lead call is a hang up, a default hang-up text is generated 547 and the system inserts pages into the record at 531. If the lead call is not a hang-up, play options 548 are initiated, where property 1 defaults 549 if the value is null, and the system enters a property number at 517.

Figure 5D:
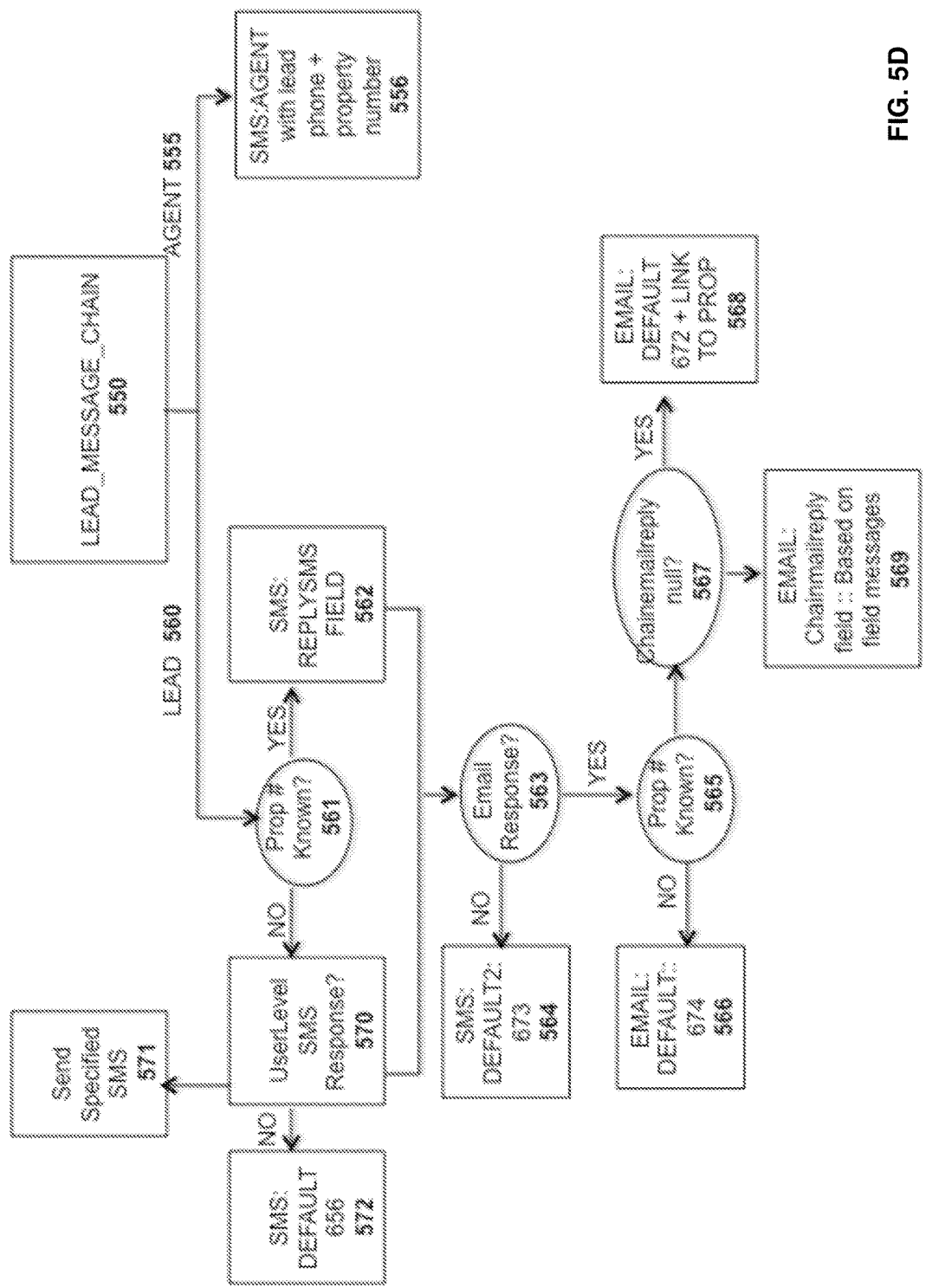
FIG. 5D is a flowchart of how a Lead Receives a Text Message in the Call Routing process.

FIG. 5D illustrates the process whereby a Lead receives a text message. A Lead Message Chain 550 comprises an Agent 555 component and a Lead 560 component. An Agent 556 with a lead phone number and a property number will send a text message to the Lead. To do this, a check 561 is made whether the property number is known.

If yes, a text message reply 562 is sent and a check is made for an Email response 563. If there is no Email response, the system goes to an SMS default 564 state. If there is an Email response, another check 565 whether the property number is known is made. If the property number is not known, the system goes to an Email default 566 state. If the property number is known, a check is made whether the chainmail reply is null 567. If null, the system goes to an Email default state 568 and links to the property. If not null, the chainmail reply field is accessed 569 and reply is based on field messages.

If the property number is not known, the system queries 570 whether a UserLevel SMS response text should be sent. If yes, the specified text is sent 571. If no, the system goes to an SMS default 572 state.

Figure 5E:
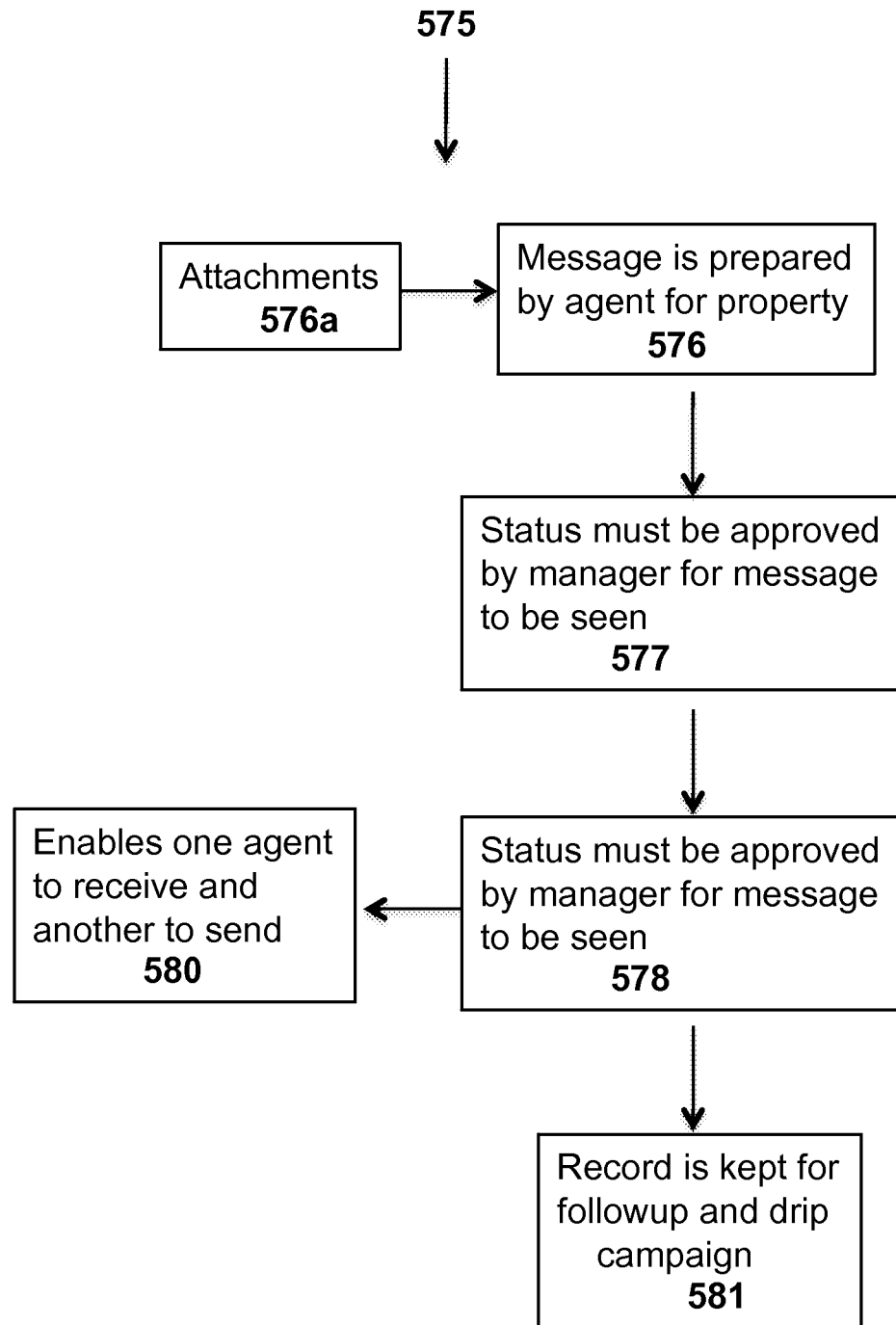
FIG. 5E is a flowchart of Automessages in the Call Routing process.

FIG. 5E illustrates the Automessages process 575. A message 576, which optionally can include attachments 576a, is prepared by the assigned agent for the property. A manager must approve 577 the message status before the message can be sent. Any reply to the message is defined 578 on the message level, not by the agent. This enables one agent to send and another to receive at 580. A record 581 of the messages is kept for follow-up and the drip campaign.

Figure 5F:
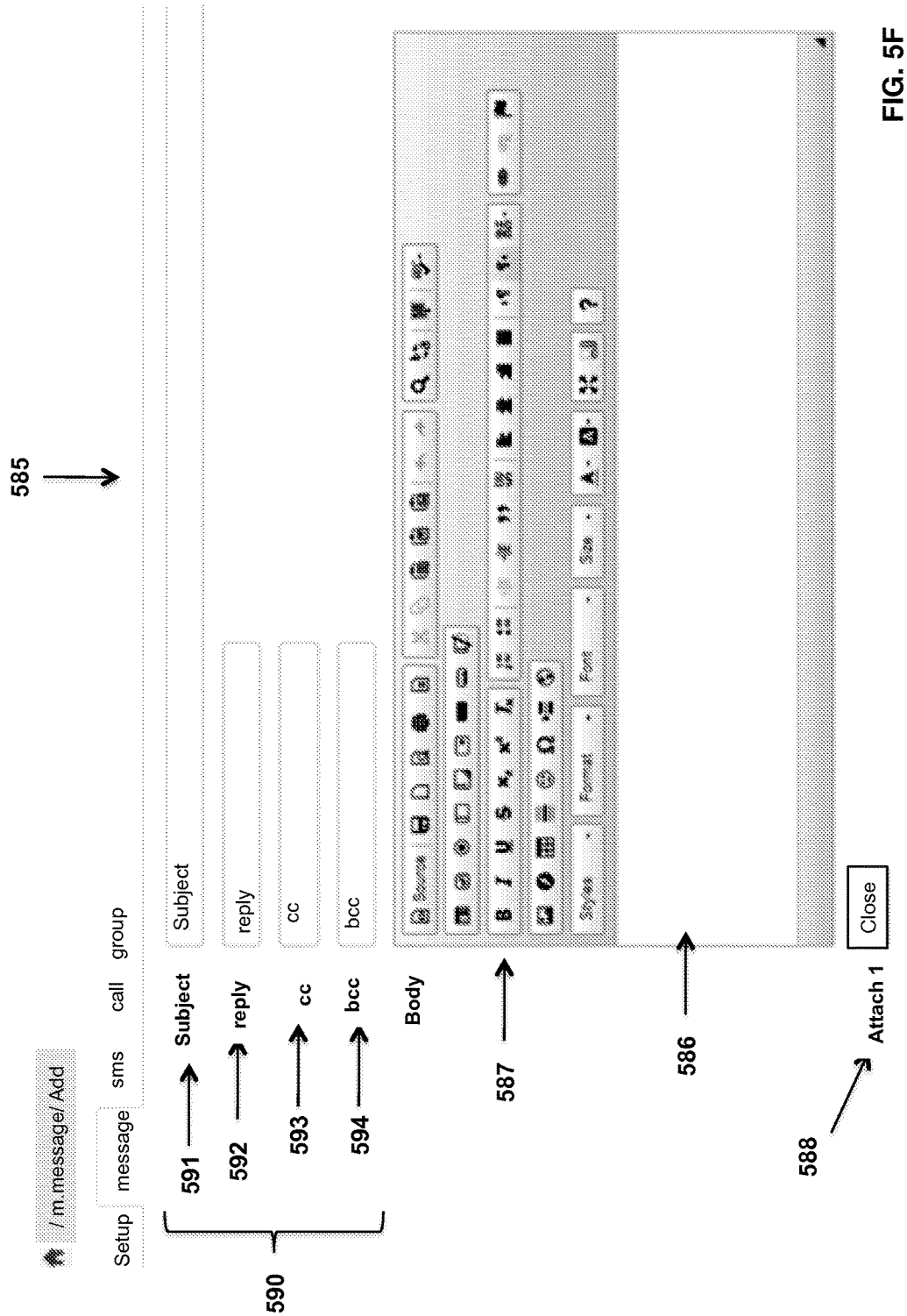
FIG. 5F is a screenshot of an Adding Message screen in the Call Routing process.

FIG. 5F shows an example of a screen 585 for adding messages. The messages may be created by the assigned Agent at 586 via a known and standard toolbar 587. Attachments may be chosen and attached to the message at 588. The screen comprises the standard fields 590 including a Subject line 591, Reply 592, cc (carbon copy) 593 and bcc (Blind Carbon Copy) 594.

Figure 6:
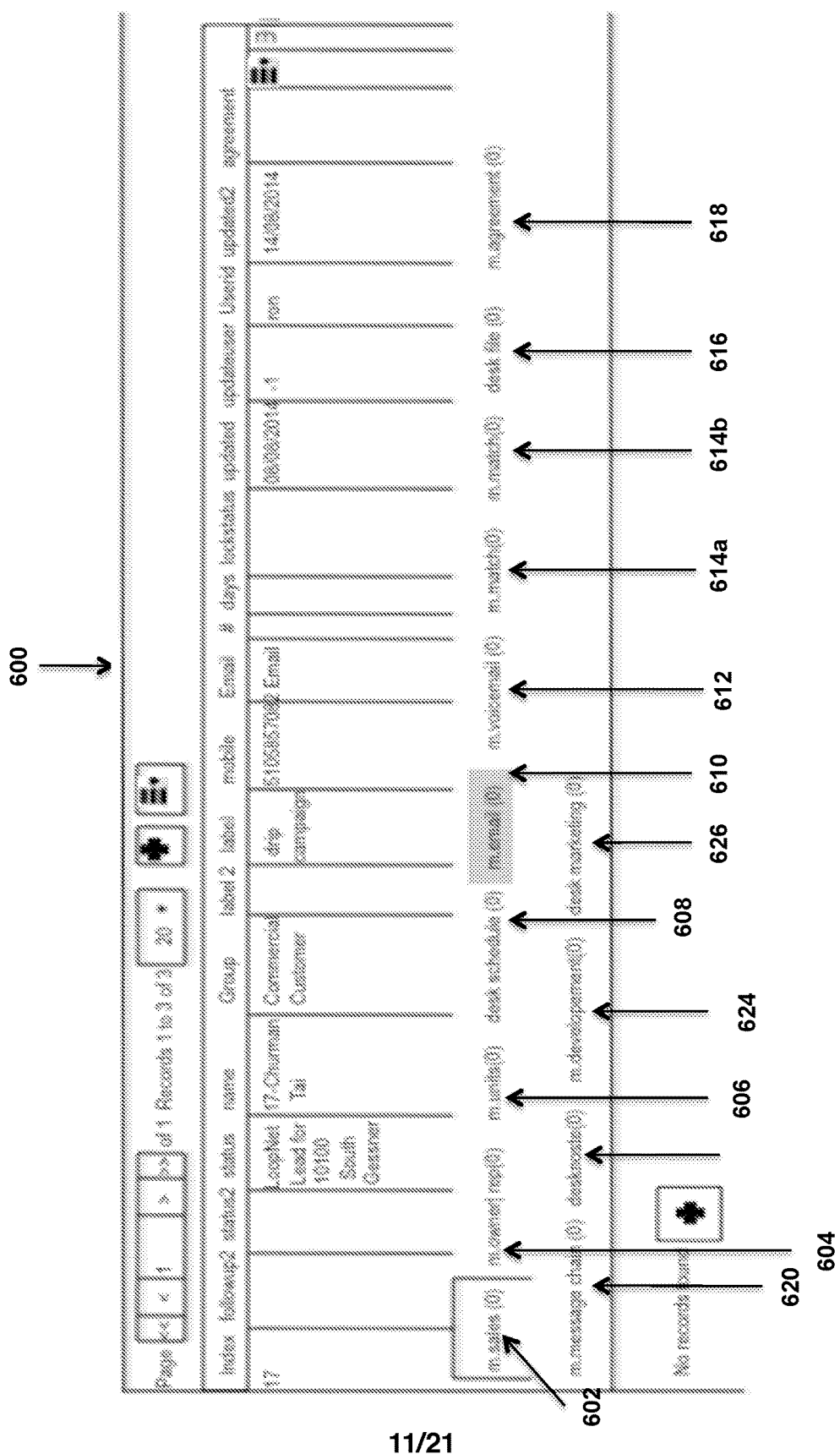
FIG. 6 is a screenshot of a lead table illustrating the Social Relationships feature.

FIG. 6 shows an example of a screen 600 displaying Social Relationships in an agents' lead table. Each relationship is trackable and displays a count. At Sales 602 each agent can send material to a prospect, but have a different agent "handle". Owner/Rep 604 enables each lead to also act a representative for an owner such as a tenant, lawyer, architect, etc. The interactive management system maps the social relationships of these individuals. At Units 606 in large scale projects leads can potentially be associated with units in different ways, such as, but not limited to, among tenants/owners/family members, etc. Schedule 608 enables appointments scheduled in the system to be synced to calendaring application, such as GOOGLE CALENDAR™. Email 610 enables important emails to be linked to the leads profiles. Voicemail 612 comprises any messages that are left on the system lines.

Also, Match 614a,b enables records of any matches that are made to be sent to the lead. Matching requires that each lead has an associated profile. Files 616 enables any type of file to be associated with a lead, such as, agreements, memorandums, etc. These are uploaded to the box or dropbox based on the lead. In Agreements 618 all agreements signed are saved along with the SMTP header plus signature. Technological finger prints are kept so that there is no question that a signature came from email. Message Chain 620 enables records of the drop campaigns to be sent to the individual. Notes 622 enables agent notes, both private and public, to be added to the lead. In addition, Development 624 enables tracking and association based on the whole development rather than on unit levels. Marketing 626 comprises and properties associated with the lead.

Figure 7A:
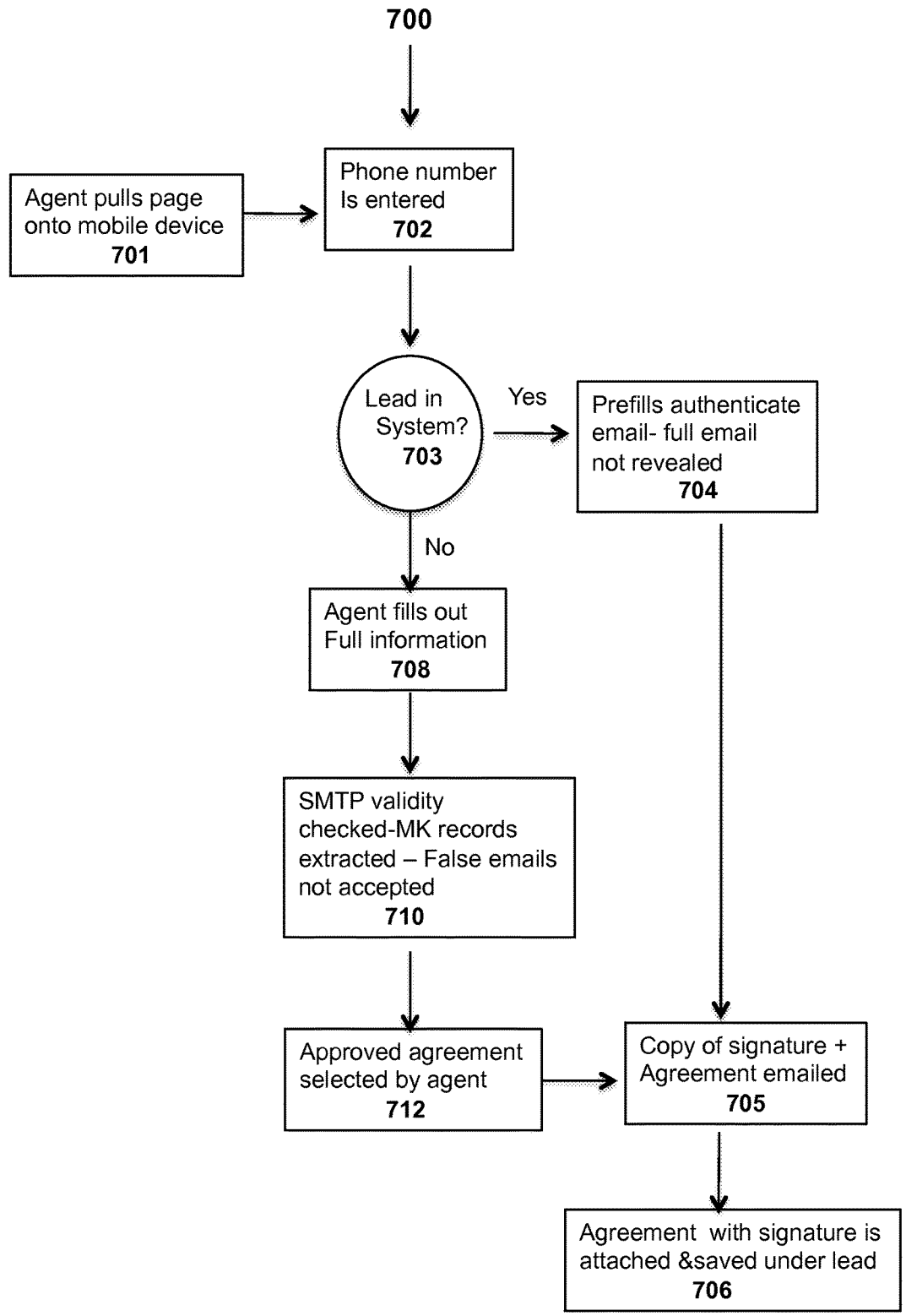
FIG. 7A is a flowchart for electronically signing an Agreement.
Figure 7B:
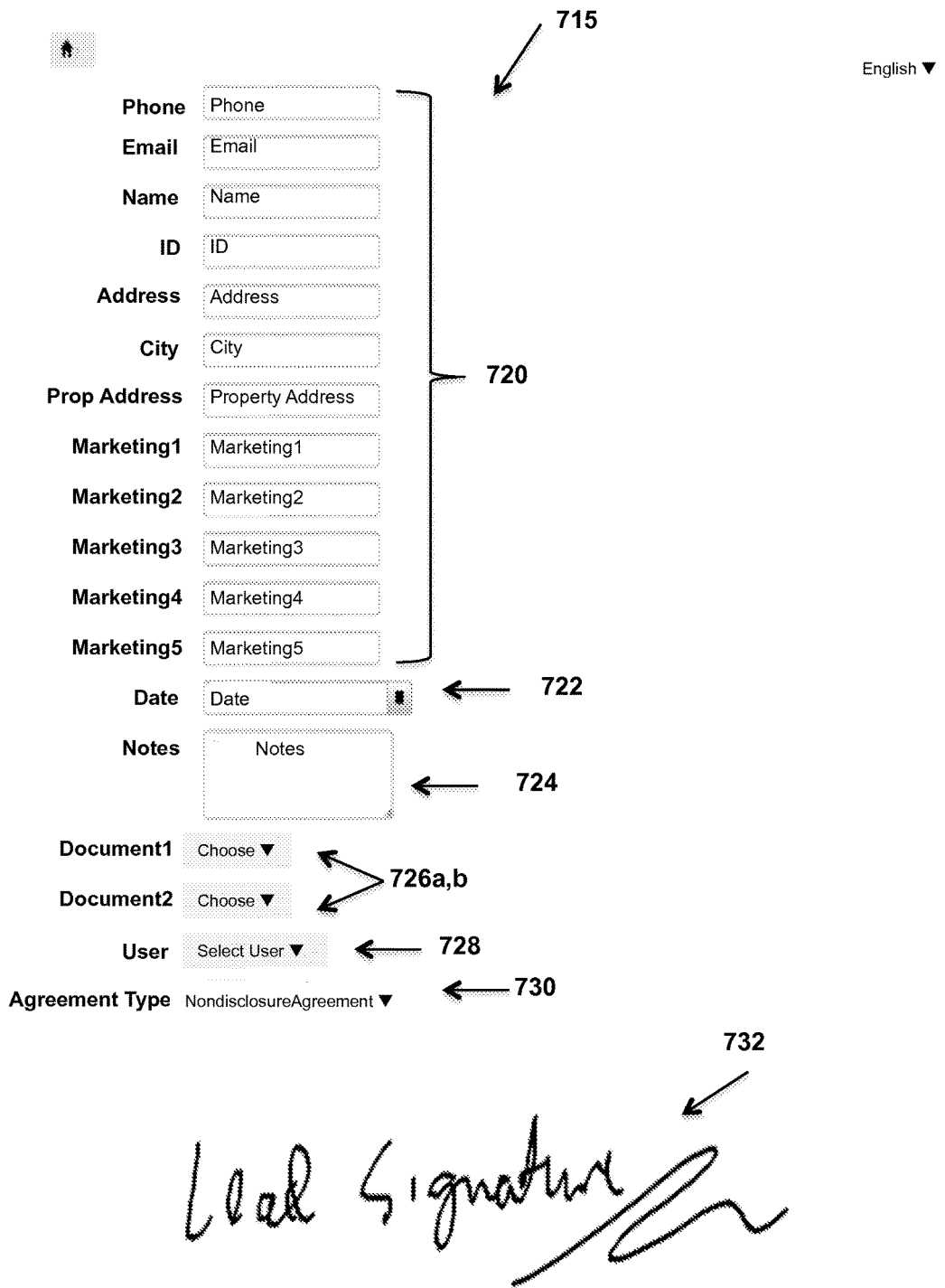
FIG. 7B depicts the signature page for the Agreement process.

FIGS. 7A-7B illustrate the Agreement signature 700 process. In FIG. 7A at 701, the Agent pulls the signature page (see FIG. 7B) onto a mobile device and enters the phone number at 702. A check is made at 703 to see if the lead is in the system. If the lead is present, an authenticated email from the system is prefilled at 704; the full email is not revealed. A copy of the signature and agreement is emailed 705 to the recipient, for example, the lead, an agent or the manager. The system also attaches and saves at 706 the agreement with signature under the lead.

If the lead is not in the system, the Agent fills out the form at 708 with all required information, such as email address, phone and physical address (see FIG. 7B). The system checks the SMTP validity by extracting MX Records at 710. False emails are not accepted. An approved agreement is selected by the Agent at 712 and a copy of the signature and agreement is emailed 705 to the recipient.

FIG. 7B is an example of a page 715 pulled onto an agent's mobile device. The Agent fills out the relevant fields, represented by 720, with the lead information, adds the date 722 and enters any notes 724, if needed or required. One or two documents can be attached at 726a,b and the user 728 and agreement type 730 are identified. The Agent electronically signs the page at 732.

Figure 8:
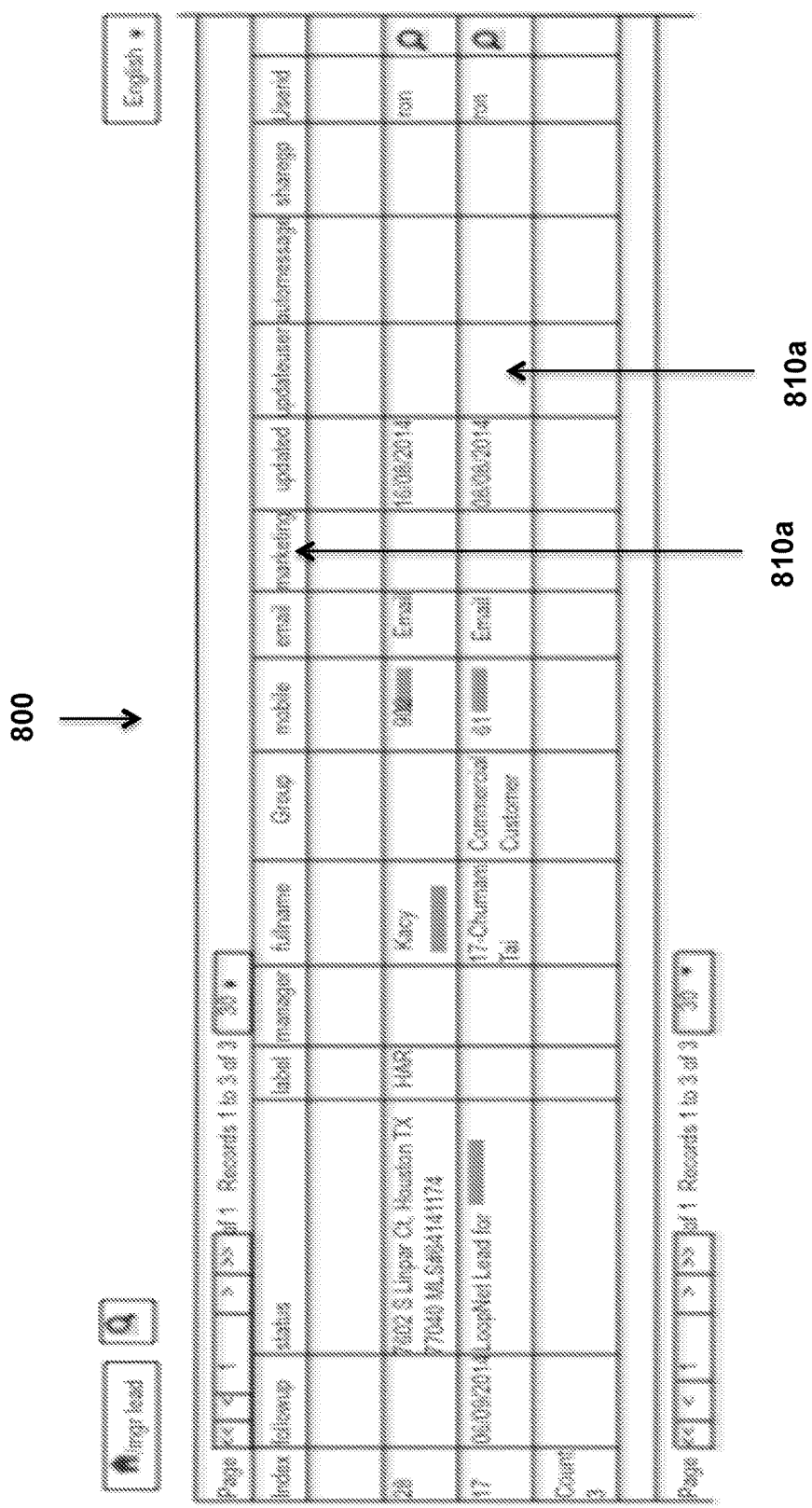
FIG. 8 is a screenshot of an Agent's lead table as viewed by a manager.

FIG. 8 is an example of an agent's lead record 800 to which a manager has access. The view contains records 810a,b of an Agents' leads, including relevant information, i.e., a lead table. Each record is highlighted (see FIG. 9). Importantly, the manager can only check on an Agents leads, that is, the lead table input cannot be edited by the manager.

Figure 9:
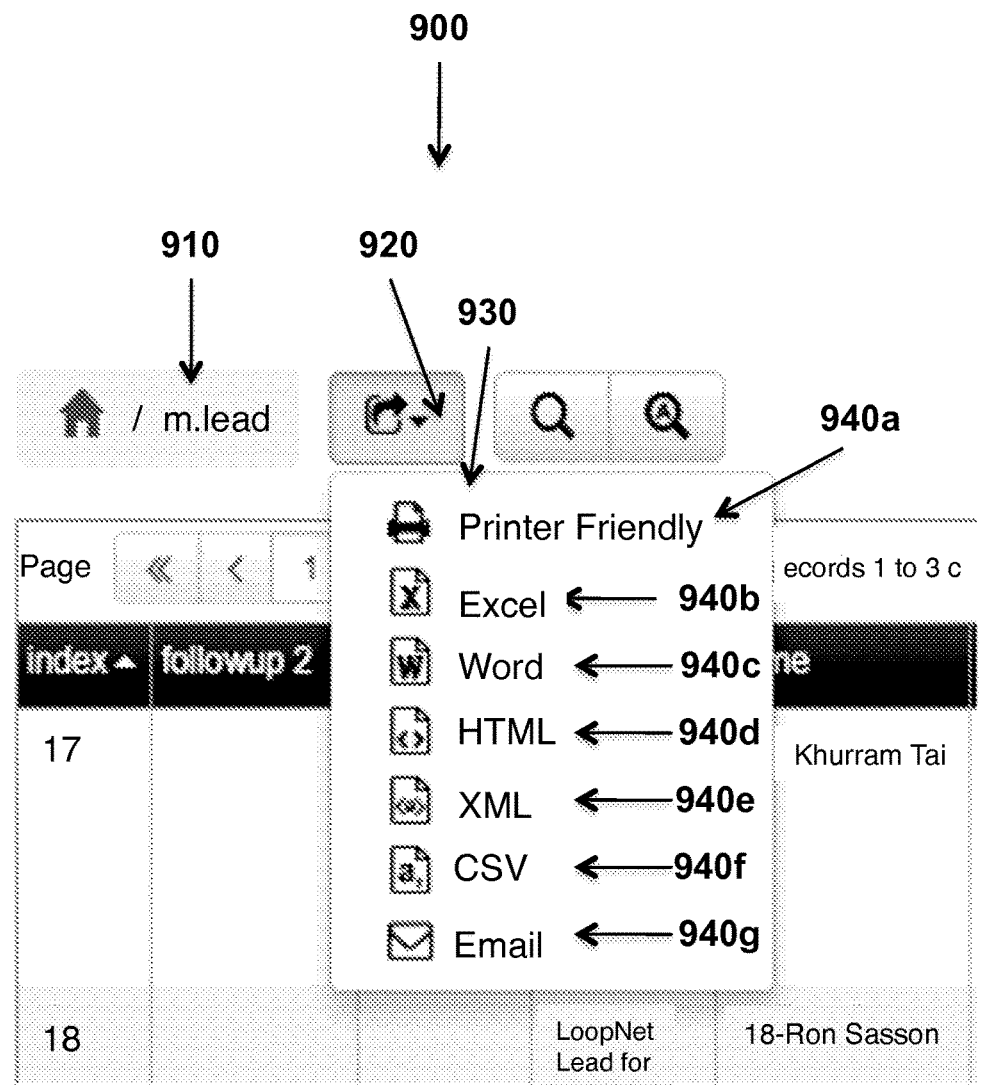
FIG. 9 is a partial screenshot of an Agent's lead table depicting the Exporting feature.

FIG. 9 demonstrates the Exporting 900 feature. For example an Agent can decide to share information about a lead. The Agent's lead screen 910 comprises a button 920 with a drop down menu 930. The Agent can choose from the menu a format with which to export the information. The options comprise well-known and standard applications such as a Printer Friendly 940a format, as an Excel document 940b, a Word document 940c, as an HTML 940d, XML 940e or CSV 940f format, or the information may be exported in an Email 940g. Concomitantly, the interactive system enables an import of information.

Figure 10A:
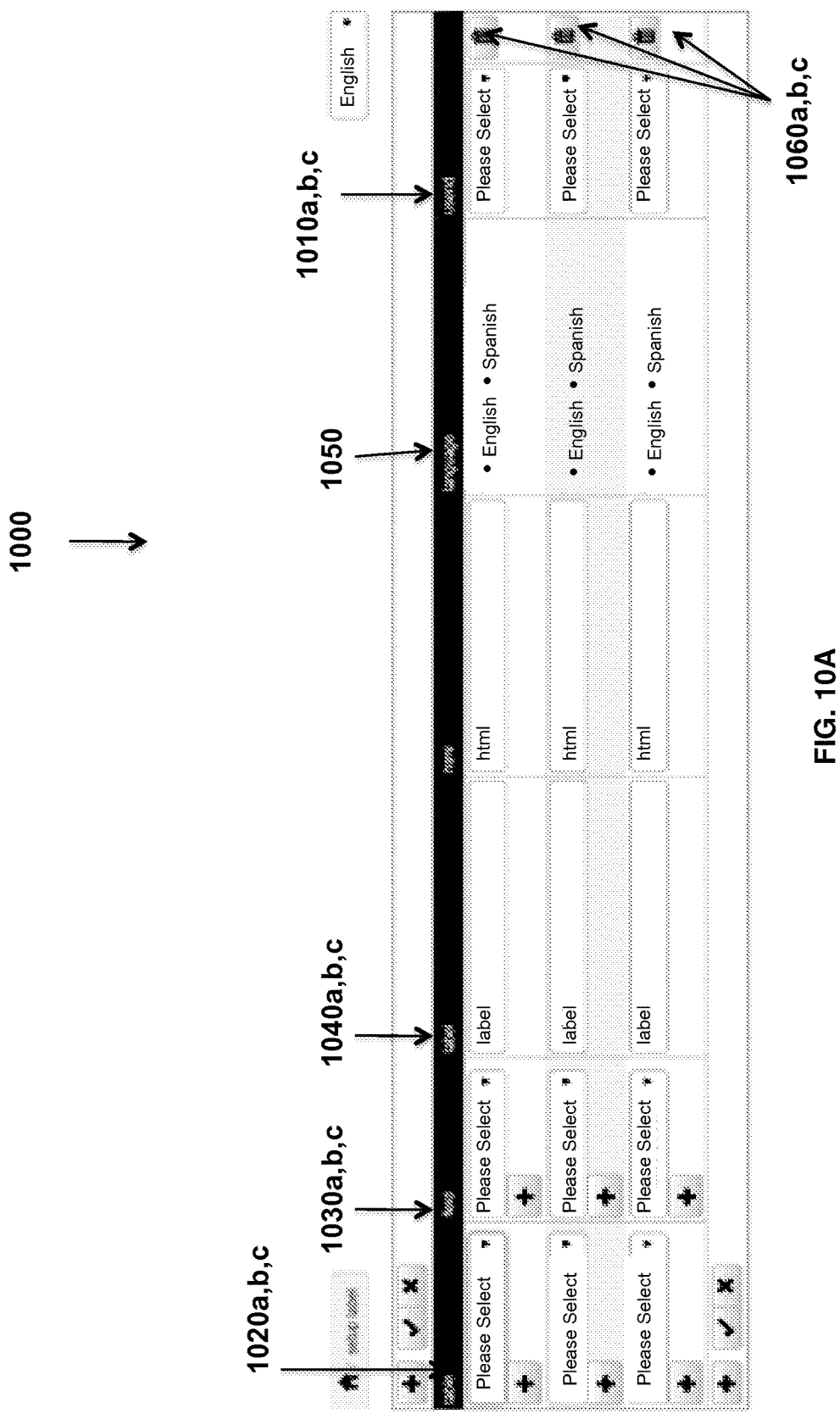
FIG. 10A is a screenshot showing the input fields for the Labels process.
Figure 10B:
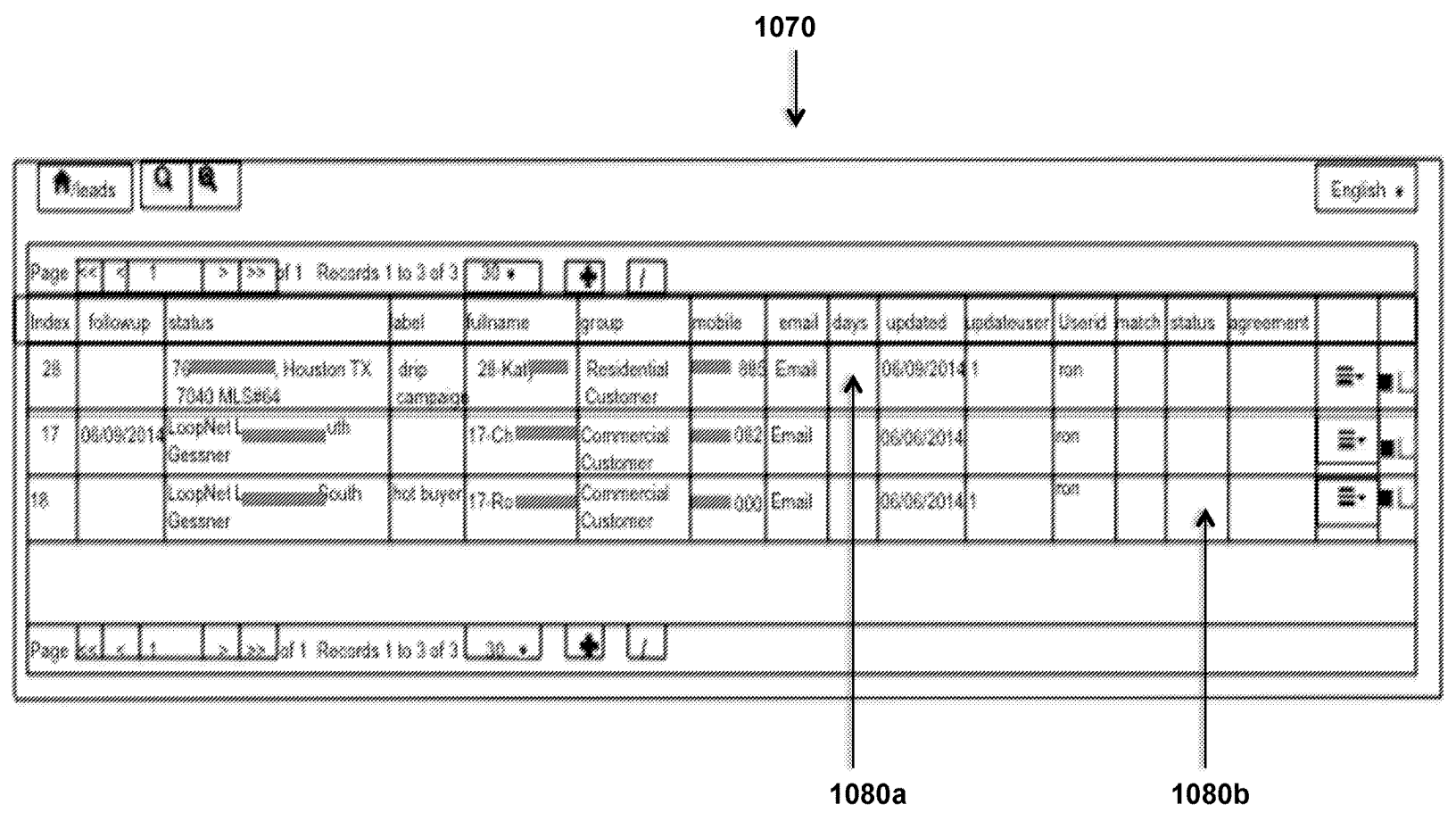

FIGS. 10A-10B demonstrate the Labels features. FIG. 10A illustrates the setup label 1000 feature. An agent enters an assigned user ID 1010a,b,c for each of one or more selected tables 1020a,b,c and can further select a field 1030a,b,c within the tables to be labeled or highlighted. A label 1040a,b,c, such as a highlighting color, is selected for each table/field and applied. The Agent can choose the language 1050 for each selection or opt to delete the label at 1060a,b,c. FIG. 10B is an example of an agent's lead table 1070 illustrating labeled entries 1080a,b. Note that the lead table is similar to that in FIG. 8, however, in this instance the Agent can edit the contents.

Figure 11:
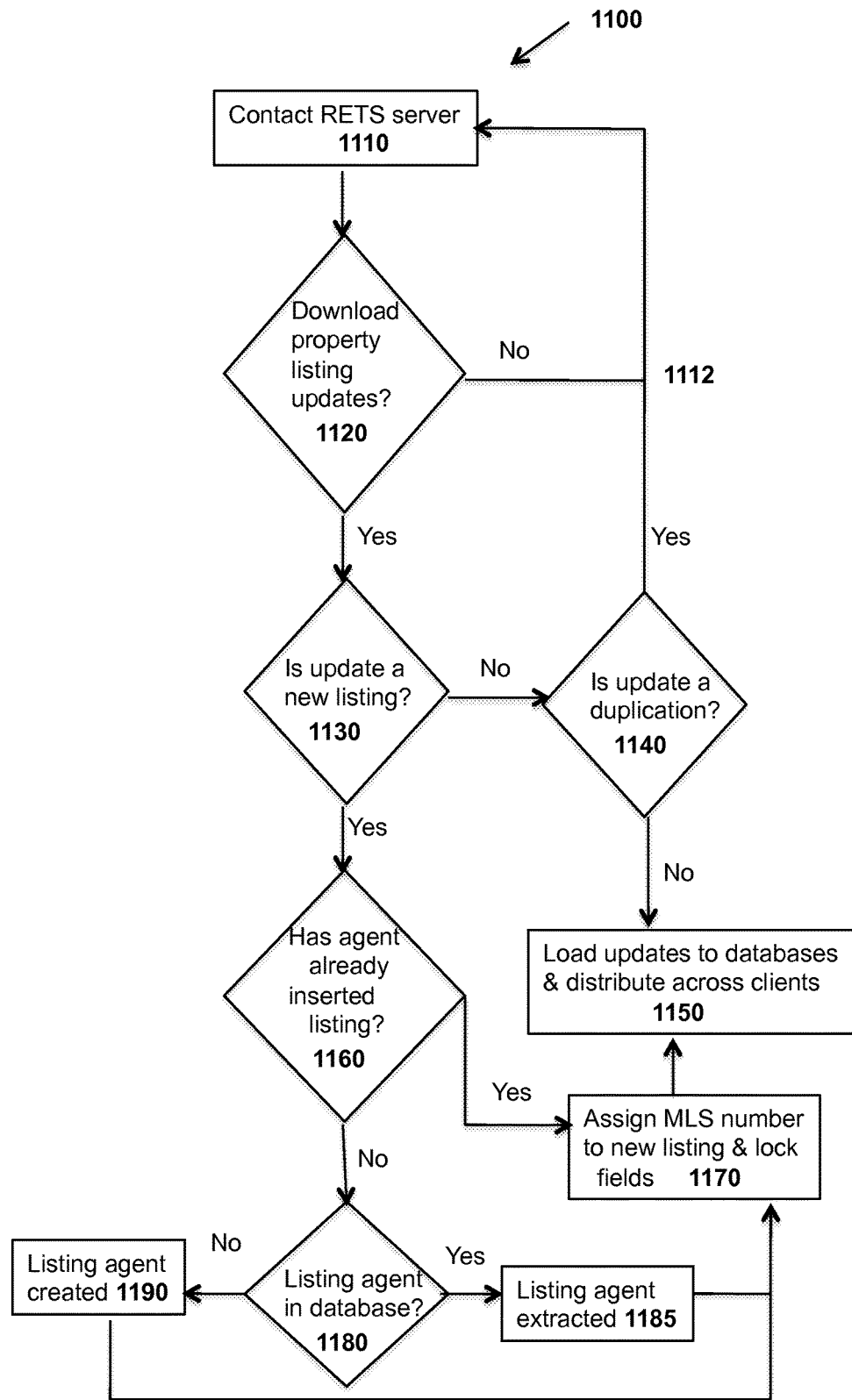
FIG. 11 is a flow chart for adding properties to the system.

FIG. 11 describes in flowchart 1100 how MLS properties are entered into the system from the RETS server. In order not to create a load on the server both in terms of processor and memory the RETS server is contacted hourly at 1110. If no updates are downloaded at 1120, the system returns to hourly contact at 1112. If the updates are downloaded at 1120 and the update is not a new property listing at 1130, the updates are checked to see if they are duplications at 1140 by checking fields such as street address and number of the property in the update. If the update is a duplicate of a previous update, the system returns to hourly contact at 1112. Otherwise the updates are loaded to one or more databases in the system and distributed across any of the system clients at 1150.

If the update is a new property at 1130, it is checked at 1160 to see whether an agent has already inserted the listing. If yes, than an MLS number is assigned to the new property and the MLS fields are locked at 1170 so that the system will be in sync with the MLS. The new listing can be uploaded and distributed at 1150. If the new listing has not been inserted, a check 1180 is made for the listing agent in the database and extracted at 1185 or created at 1190 if not currently in the system. The new listing then proceeds through the system with an MLS number assigned and the fields locked at 1170 and subsequent insertion into the databases and distribution at 1150. The system can handle all MLS nationwide preventing duplication and keeping agents well organized.

Figure 12:
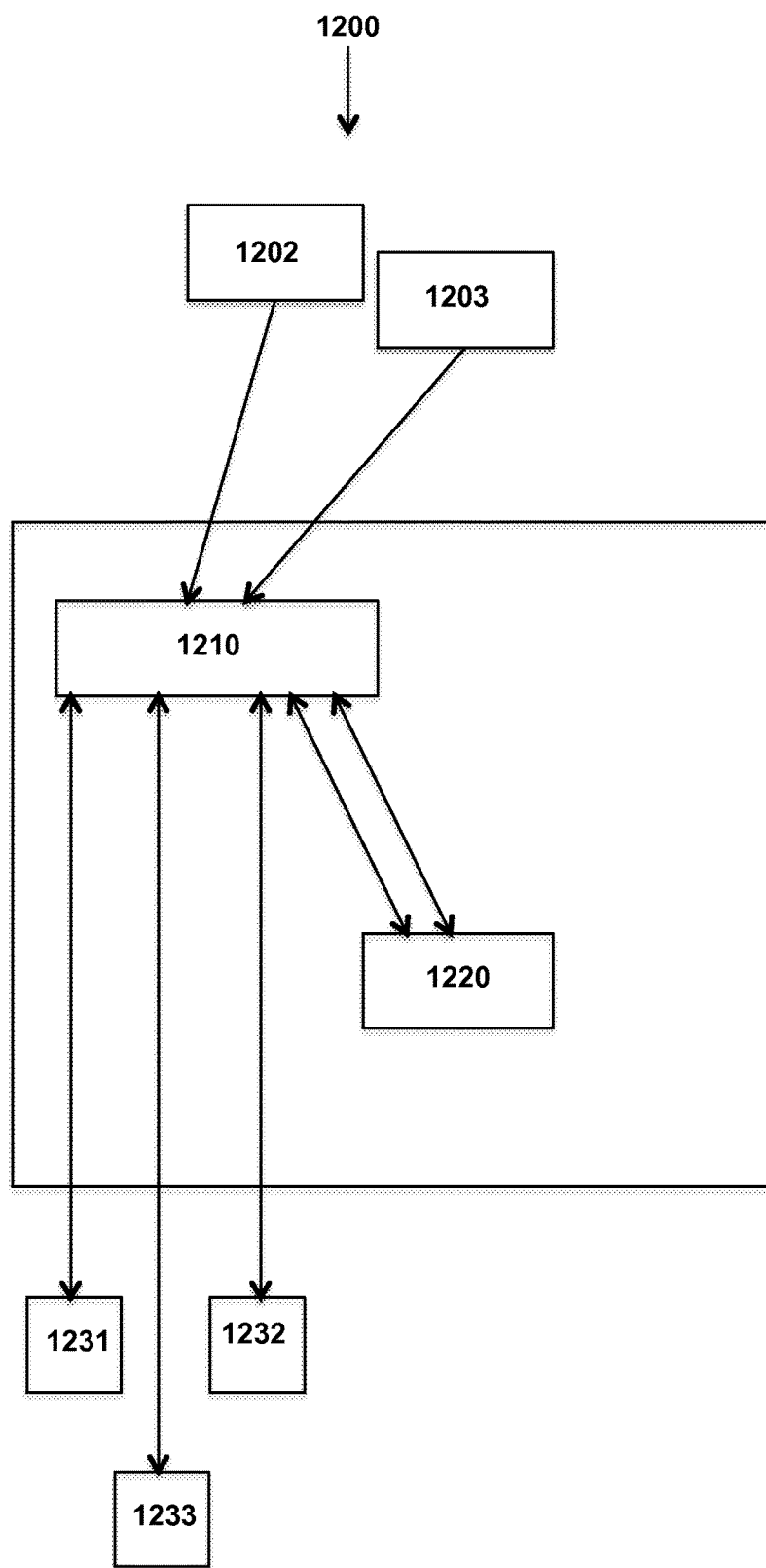
FIG. 12 describes how email is processed and inquiries handled by the system.

FIG. 12 shows that the system 1200 can handle the creation of leads from third party email sites. For example an email, represented by 1202, 1203 comes from a popular website such as HAR.com or LOOPNET.com. The email is stripped and processed at 1210 to create a lead with all available information from the email. The lead is stored in database 1220. Upon receiving specific inquiries, represented by 1231, 1232, 1233, the processing logic at 1210 triggers automatic responses to the incoming leads extracted from the emails 1202, 1203 as they are matched against the specific inquires.

Figure 13:
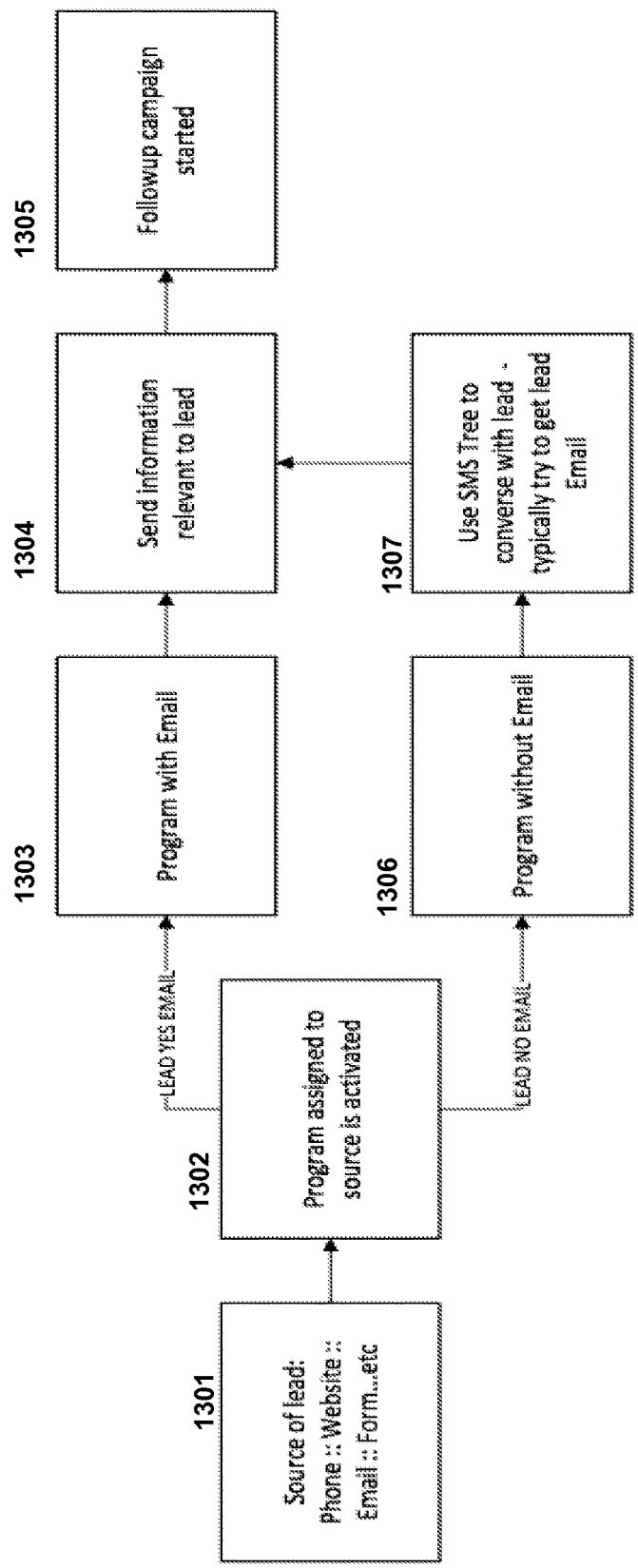
FIG. 13 is a flow chart for the process of managing an incoming call of a new lead using the system.

FIG. 13 shows the process of managing an incoming call of a new lead using the system of the present invention. The system receive a lead 1301 via phone, Website, email or online forms, then the program/module assigned to source is activated 1302. Next, if the program includes email 1303, the system will send information related to the lead 1304 and start follow up campaign 1305. However, if the program does not include email 1306, the system will use short message (SMS) tree to converse with lead, trying to get lead email 1307. Once the email information is obtained, the system will send information relevant to the lead 1304 and start follow up campaign 1305.

Figure 14:
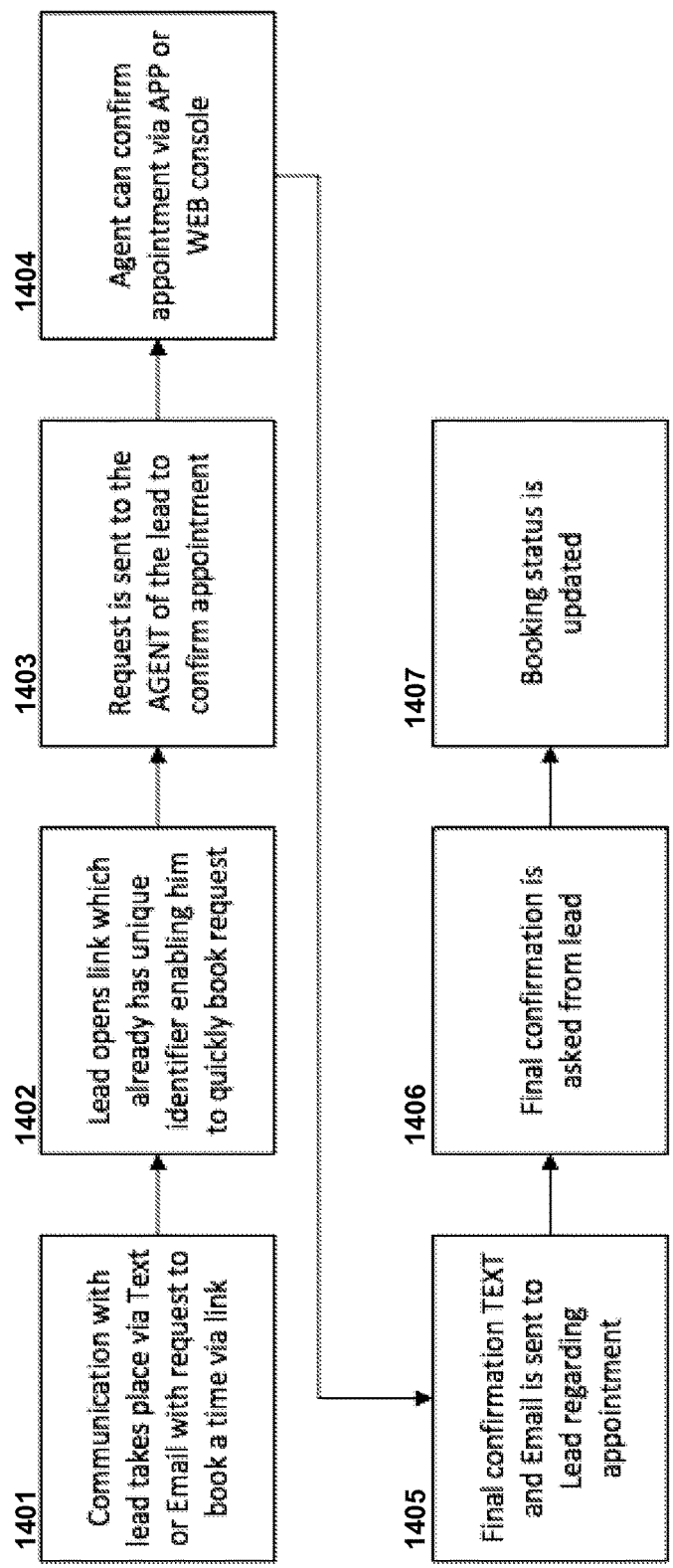
FIG. 14 is a flow chart of scheduling an appointment between a lead and an agent using the system.

FIG. 14 shows the process of an agent scheduling an appointment with a lead using the system. First the agent communicates with lead via text message or email as a first interaction that include link for scheduling a meeting time 1401. The link may be connected to a website or an application for scheduling. The lead opens link 1402, which has an unique identifier enabling the user to quickly book a time upon request. Then the system sends a confirmation request to the agent who is responsible to the lead 1403. Agent then can confirm the appointment via an application or website console 1404. A text message and email are sent as a second interaction and a first response interaction to lead regarding the booked appointment 1405 requesting a final confirmation 1406. The interactions (first and second) are not in the same mode as the first response interaction. That is, if the first interaction is a text message, then the second interaction is the text message for final confirmation and the first response interaction is the email for final confirmation. Finally, the booking status in the system is updated 1407.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Real Estate Industry

Lead capture, Automessage and Programs form the base of the system around which the components are built. They help move forward the flow of how leads are captured and processed and moved towards conversation.

Lead Capture:

Calls:

Calls are received by the interactive system and routed to agents based on business rules and events which also triggers automated processes.

In the case of calls an incoming line is assigned to either a single or multiple properties. When a lead making an inquiry call the system allows multiple routing options.

1. A call can be forward a single agent or multiple agents. In the case of multiple agents the first agent to pick up the phone will drop the other rings. SIP Endpoints can also be provided to allow calls to be routed anywhere in the world.
2. If a call is not to be picked up a lead can leave a voicemail message.
3. A message can be played and then the call can be forwarded. This allows for one agent to give the impression of a large agency.
4. Interactive Voice Response (IVR): The system also supports call routing based on IVR. That means that each number can be configured with different call routing information
5. The system also supports delivering information based on the digits entered. For example a lead can be asked to "enter" the sign number. That will trigger the messages sent.

Website

A prospect can also fill out a website form which will capture the information and begin an automatic process. The logic of what and how to respond to this lead is also handled by the system through the programs. In the property setup automatic messages are set to hand the conversation flow.

Automessages:

Automessages are the second pillar messages that are uploaded into the system by the agent, such that every event in the chain can be completely controlled and messages are consistent across agents. Multiple projects can be handled across many lines because specific custom messages can be programmed.

Assigned Programs

The automatic processing begins when predefined programs are assigned to the line. One program is for actions to be taken when a lead is not in the system and no Email has been placed. The second is when there is an Email. Typically a request for Email is made and once and the email is received the second program is triggered.

Example 2

Service Industry

A typical roofer who is mostly on the job (on the roof) receives calls which typically go unanswered and unattended. Once the email is received by the system it is attached automatically to the lead called and the set message regarding the property called is sent. A drip campaign is then triggered based on predefined dates, such as, but not limited to, 10, 20, or 45 days, which follows up on the lead. In addition follow-up emails are sent to the agent. Each lead is assigned to an Agent in a round robin, up or out campaign format.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A computer-implemented method for managing sales leads, comprising the steps of:
   generating a first interaction in a first mode with a server;
   generating a second interaction in said first mode so as to form a first computer-implemented interactive tool,
   wherein said server is electronically connected to a computer through a network connection, said computer being comprised of a processor, a memory, a display coupled to said processor, an interface, and said network connection,
   wherein said server is comprised of a database of leads and sales information, a plurality of first program modules, and said first computer-implemented interactive tool,
   wherein said plurality of first program modules is comprised of a first response program module being comprised of a first response interaction in a second mode, said first mode being different from said second mode, said first response program module being comprised of a recipient program module corresponding to an identity of a lead so as to determine a recipient agent for said identity of said lead,
   wherein said second mode is text,
   wherein said first response program module is associated with confirming an appointment,
   wherein said leads and sales information is comprised of contact information in said second mode, said contact information being comprised of said identity of said lead;
   associating said first interaction with said contact information in said second mode;
   associating said first interaction and said contact information in said second mode with said first response program module; and
   sending said first response interaction in said second mode according to said first response program module concurrent with said step of generating said second interaction in said first mode so as to confirm said appointment in said second mode;
   associating said first interaction with said identity of said lead;
   associating said first interaction and said identity of said lead with said recipient program module;
   sending a text message according to said recipient program module so as to determine feedback information from said identity of said lead,
   wherein said plurality of first program modules is further comprised of a preset program module corresponding to said feedback information;
   associating said text message with said feedback information; and
   associating said text message and said feedback information with said preset program module,
   wherein said preset program module is comprised of at least one of a group consisting of: a signature request to verify said feedback information, an update to said database with said feedback information, an automatic message with said feedback information to agents, an export of sales information related to said feedback information from said database, and a synchronization of sales information between said server and said computer.

2. The method of claim 1, wherein said computer is selected from a group consisting of: a personal computer, a server computer, a smart phone and a tablet computer.

3. The method of claim 1, wherein said server is selected from a group consisting of: a Simple Mail Transfer Protocol server, a Domain Name System server, a web server, a Multiple Listing Service, an accounting server, a Secure Sockets Layer (SSL) server and a Transport Layer Security (TLS) server.

4. The method of claim 1, wherein said plurality of first program modules is further comprised of a sending program module so as to send intelligent messages as selected by an agent through said computer, said intelligent messages being comprised of sales information to sales leads at a point of contact.

5. The method of claim 1, wherein said database of leads and sales information is searchable through said computer.

6. The method of claim 1, wherein said leads and sales information on said database is comprised of extracted lead information from a third party source, and wherein said third party source is an application program interface.

7. The method of claim 1, wherein said leads and sales information on said database is comprised of one of a group consisting of: price, location, type of sales, and seller's information.

8. The method of claim 1, wherein said user interface is connected to a help module so as to access and create help tips through said computer,
   wherein said user interface is connected to a schedule module so as to schedule meetings and book time through said computer,
   wherein said user interface is connected to a notes module so as to enter notes for a lead through said computer,
   wherein said user interface is connected to a goal module so as to track progress of an agent by a manager through said computer,
   wherein said user interface is connected to a file module so as to attach computer files to a corresponding lead in said database,
   wherein said user interface is connected to a voicemail module so as to listen to messages through said computer,
   wherein said user interface is connected to an agreement module so as to process signed agreements through said computer,
   wherein said user interface is connected to a pocket listing module so as to list market properties on said computer,
   wherein said user interface is connected to a Multiple Listing Service module to so as to manage listings from a Multiple Listing Service through said computer, wherein said user interface is connected to a report module so as to provide report and overview for a corresponding lead in said database,
wherein said user interface is connected to a setup module so as to configure system features on said computer, and
wherein said user interface is connected to a lead connect module so as to enable third part advertisement source connections through said computer.

9. The method of claim 8, wherein said goal module is connected to said user interface so as to set goals for a corresponding lead in said database by an agent.

10. The method of claim 8, wherein said user interface is connected to a synchronize sales leads information module so as to connect said computer with third-party software.

11. The method of claim 10, wherein said third-party software is connected to said computer so as to send a lead request for booking time through said computer, synchronize calendar availability from agents through said computer, display available times to respective leads, choose a time by a respective lead, send confirmations to said respective lead and corresponding agent through said computer, and
mark a scheduled time in calendar through said computer.

12. The method of claim 1, wherein said plurality of program modules is comprised of a preset program module being comprised of synchronizing information for said database and third-party software so as to schedule events for each lead via said user interface.

13. The method of claim 1,
wherein said first mode is email communication, and
wherein said first interaction in said first mode is an email message.

14. A computer-implemented method for tracking sale progress of an agent, comprising the steps of:
generating a first interaction in a first mode with a server;
generating a second interaction in said first mode so as to form a first computer-implemented interactive tool,
wherein said server is electronically connected to a computer through a network connection, said computer being comprised of a processor, a memory, a display coupled to said processor, a user interface, and said network connection,
wherein said server is comprised of a database of leads and sales information, a plurality of first program modules, and said first computer-implemented interactive tool,
wherein said plurality of first program modules is comprised of a first response program module being comprised of a first response interaction in a second mode, said first mode being different from said second mode, said first response program module being comprised of a recipient program module corresponding to an identity of a lead so as to determine a recipient agent for said identity of said lead,
wherein said second mode is text,
wherein said leads and sale information is comprised of information leading up to a sale and post sale and said identity of said lead;
associating said first interaction with said identity of said lead;
associating said first interaction and said identity of said lead with said recipient program module;
sending a text message according to said recipient program module so as to determine feedback information from said identity of said lead,
wherein said plurality of first program modules is further comprised of a preset program module corresponding to said feedback information;
associating said text message with said feedback information; and
associating said text message and said feedback information with said preset program module,
wherein said preset program module is comprised of at least one of a group consisting of: a signature request to verify said feedback information, an update to said database with said feedback information, an automatic message with said feedback information to agents, an export of sales information related to said feedback information from said database, and a synchronization of sales information between said server and said computer;
wherein said plurality of first program modules is further comprised of a program module associated with confirming information leading up to a sale and post sale,
associating said first interaction with said information leading up to said sale and post sale;
associating said first interaction and said information leading up to said sale and post sale with said first response program module; and
sending another first response interaction in said second mode according to said program module associated with confirming information leading up to a sale and post sale, before said step of generating said second interaction in said first mode so as to confirm said information leading up to a sale and post sale.

15. The method of claim 14,
wherein said first mode is email communication, and
wherein said first interaction in said first mode is an email message.

16. A computer-implemented method for managing sales leads, comprising the steps of:
generating a communication email interaction with a server;
generating a final confirmation email interaction so as to form a computer-implemented interactive tool,
wherein said server is electronically connected to a computer through a network connection, said computer being comprised of a processor, a memory, a display coupled to said processor, an interface, and said network connection,
wherein said server is comprised of a database of leads and sales information, a plurality of program modules, and said computer-implemented interactive tool,
wherein said plurality of program modules is comprised of a response program module being comprised of a confirmation text interaction, said first response program module being comprised of a recipient program module corresponding to an identity of a lead so as to determine a recipient agent for said identity of said lead,
wherein said response program module is associated with confirming an appointment,
wherein said leads and sales information is comprised of contact information in said second mode, said contact information being comprised of said identity of said lead;
associating said communication email interaction with said contact information;
associating said communication email interaction and said contact information with said response program module;

sending said confirmation text interaction according to said response program module concurrent with said step of generating said confirmation email interaction so as to confirm said appointment in said second mode by text, associating said first interaction with said identity of said lead;

associating said first interaction and said identity of said lead with said recipient program module;

sending a text message according to said recipient program module, said text message being said communication text interaction, so as to determine feedback information from said identity of said lead, wherein said plurality of first program modules is further comprised of a preset program module corresponding to said feedback information;

associating said text message with said feedback information; and associating said text message and said feedback information with said preset program module, wherein said preset program module is comprised of at least one of a group consisting of: a signature request to verify said feedback information, an update to said database with said feedback information, an automatic message with said feedback information to agents, an export of sales information related to said feedback information from said database, and a synchronization of sales information between said server and said computer.

* * * * *